US012230259B2

(12) United States Patent
Eskimez et al.

(10) Patent No.: US 12,230,259 B2
(45) Date of Patent: Feb. 18, 2025

(54) ARRAY GEOMETRY AGNOSTIC MULTI-CHANNEL PERSONALIZED SPEECH ENHANCEMENT

(71) Applicant: Microsoft Technology Licensing, LLC, Redmond, WA (US)

(72) Inventors: Sefik Emre Eskimez, Bellevue, WA (US); Takuya Yoshioka, Bellevue, WA (US); Huaming Wang, Clyde Hill, WA (US); Hassan Taherian, Columbus, OH (US); Zhuo Chen, Redmond, WA (US); Xuedong Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 17/555,332

(22) Filed: Dec. 17, 2021

(65) Prior Publication Data

US 2023/0116052 A1    Apr. 13, 2023

Related U.S. Application Data

(60) Provisional application No. 63/252,493, filed on Oct. 5, 2021.

(51) Int. Cl.
*G10L 15/20*    (2006.01)
*G10L 15/22*    (2006.01)
*G10L 21/0208*    (2013.01)

(52) U.S. Cl.
CPC ............. *G10L 15/20* (2013.01); *G10L 15/22* (2013.01); *G10L 21/0208* (2013.01)

(58) Field of Classification Search
CPC ......... G10L 15/20; G10L 15/22; G10L 17/04; G10L 17/18; G10L 2021/02087; G10L 21/0208
See application file for complete search history.

(56) References Cited

U.S. PATENT DOCUMENTS 10,957,337 B2 *   3/2021   Chen ..................... G10L 17/04
11,508,388 B1 *   11/2022  Souden .................. G06N 3/08
(Continued)

OTHER PUBLICATIONS

Dubey, et al., "ICASSP 2022 Deep Noise Suppression Challenge", In Repository of arXiv:2202.13288v1, Feb. 27, 2022, 5 Pages.
(Continued)

*Primary Examiner* — Huyen X Vo
(74) *Attorney, Agent, or Firm* — Barta Jones, PLLC

(57) ABSTRACT

Examples of array geometry agnostic multi-channel personalized speech enhancement (PSE) extract speaker embeddings, which represent acoustic characteristics of one or more target speakers, from target speaker enrollment data. Spatial features (e.g., inter-channel phase difference) are extracted from input audio captured by a microphone array. The input audio includes a mixture of speech data of the target speaker(s) and one or more interfering speaker(s). The input audio, the extracted speaker embeddings, and the extracted spatial features are provided to a trained geometry-agnostic PSE model. Output data is produced, which comprises estimated clean speech data of the target speaker(s) that has a reduction (or elimination) of speech data of the interfering speaker(s), without the trained PSE model requiring geometry information for the microphone array.

18 Claims, 14 Drawing Sheets

(56) References Cited

U.S. PATENT DOCUMENTS

| | | | | |
|---|---|---|---|---|
| 2015/0071461 | A1* | 3/2015 | Thyssen | G10L 21/0208 381/94.1 |
| 2021/0312907 | A1* | 10/2021 | Moreno | G10L 17/20 |
| 2022/0084509 | A1* | 3/2022 | Sivaraman | G06N 3/045 |

OTHER PUBLICATIONS

Grumiaux, et al., "A Review of Sound Source Localization with Deep Learning Methods", In Repository of arXiv:2109.03465v1, Sep. 8, 2021, 26 Pages.

"International Search Report and Written Opinion Issued in PCT Application No. PCT/US22/040979", Mailed Date: Nov. 21, 2022, 10 Pages.

Reddy, et al., "ICASSP 2021 Deep Noise Suppression Challenge", In Repository of arXiv:2009.06122v2, Oct. 26, 2020, 5 Pages.

Wang, et al., "Combining Spectral and Spatial Features for Deep Learning Based Blind Speaker Separation", In Journal of IEEE/ACM Transactions on audio, speech, and language processing vol. 27, Issue 2, Feb. 1, 2019, pp. 457-468.

Wang, et al., "Multi-Microphone Complex Spectral Mapping for Speech Dereverberation", In Proceedings of IEEE International Conference on Acoustics, Speech and Signal Processing, May 4, 2020, pp. 486-490.

Chakrabarty, et al., "Time-Frequency Masking Based Online Multi-Channel Speech Enhancement With Convolutional Recurrent Neural Networks", In Journal of Selected Topics in Signal Processing, vol. 13, Issue 4, Aug. 2019, pp. 787-799.

Chen, et al., "Continuous Speech Separation with Conformer", In Proceedings of International Conference on Acoustics, Speech and Signal Processing, Jun. 6, 2021, pp. 5749-5753.

Chen, et al., "Deep Attractor Network for Single-Microphone Speaker Separation", In Proceedings of International Conference on Acoustics, Speech and Signal Processing, Mar. 5, 2017, pp. 246-250.

Chiley, et al., "Online Normalization for Training Neural Networks", In Proceedings of 33rd Conference on Neural Information Processing Systems, Dec. 8, 2019, 11 Pages.

Choi, et al., "Phase-Aware Speech Enhancement with Deep Complex U-Net", In Proceedings of 7th International Conference on Learning Representations, May 6, 2019, 20 Pages.

De, et al., "Impact of Digital Surge During Covid-19 Pandemic: A Viewpoint on Research and Practice", In International Journal of Information Management, vol. 55, Dec. 2020, 5 Pages.

Delcroix, et al., "Improving Speaker Discrimination of Target Speech Extraction With Time-Domain Speakerbeam", In Proceedings of International Conference on Acoustics, Speech and Signal Processing, May 4, 2020, pp. 691-695.

Delcroix, et al., "Single Channel Target Speaker Extraction and Recognition with Speaker Beam", In Proceedings of International Conference on Acoustics, Speech and Signal Processing, Apr. 15, 2018, pp. 5554-5558.

Eskimez, et al., "Human Listening and Live Captioning: Multi-Task Training for Speech Enhancement", In Proceedings of InterSpeech, Aug. 30, 2021, pp. 2686-2690.

Fonseca, et al., "Freesound Datasets: A Platform for the Creation of Open Audio Datasets", In Proceedings of the 18th International Society for Music Information Retrieval Conference, Oct. 23, 2017, pp. 486-493.

Gamper, et al., "Intrusive and Non-Intrusive Perceptual Speech Quality Assessment Using a Convolutional Neural Network", In Proceedings of Workshop on Applications of Signal Processing to Audio and Acoustics, Oct. 20, 2019, pp. 85-89.

Gemmeke, et al., "Audio Set: An Ontology and Human-Labeled Dataset for Audio Events", In Proceedings of International Conference on Acoustics, Speech and Signal Processing, Mar. 5, 2017, pp. 776-780.

Giri, et al., "Personalized PercepNet: Real-time, Low-complexity Target Voice Separation and Enhancement", In Proceedings of InterSpeech, Aug. 30, 2021, pp. 1124-1128.

Gulati, et al., "Conformer: Convolution-augmented Transformer for Speech Recognition", In Repository of arXiv:2005.08100v1, May 16, 2020, 5 Pages.

Hershey, et al., "Deep Clustering: Discriminative Embeddings for Segmentation and Separation", In Proceedings of International Conference on Acoustics, Speech and Signal Processing, Mar. 20, 2016, pp. 31-35.

Hu, et al., "DCCRN: Deep Complex Convolution Recurrent Network for Phase-Aware Speech Enhancement", In Repository of arXiv:2008.00264v1, Aug. 1, 2020, 5 Pages.

Sik, et al., "Single-Channel Multi-Speaker Separation using Deep Clustering", In Proceedings of 17th Annual Conference of the International Speech Communication Association, Sep. 8, 2016, pp. 545-549.

Li, et al., "Direction-aware Speaker Beam for Multi-channel Speaker Extraction", In Proceedings of 20th Annual Conference of the International Speech Communication Association, Sep. 15, 2019, pp. 2713-2717.

Luo, et al., "End-to-End Microphone Permutation and Number Invariant Multi-channel Speech Separation", In Proceedings of International Conference on Acoustics, Speech and Signal Processing, May 4, 2020, pp. 6394-6398.

McCowan, et al., "The AMI Meeting Corpus", In Proceedings of the 5th International Conference on Methods and Techniques in Behavioral Research, vol. 88, Aug. 30, 2005, 4 Pages.

Reddy, et al., "Interspeech 2021 Deep Noise Suppression Challenge", In Repository of arXiv:2101.01902v1, Jan. 6, 2021, 5 Pages.

Sato, et al., "Should We Always Separate ?: Switching Between Enhanced and Observed Signals for Overlapping Speech Recognition", In Proceedings of InterSpeech, Aug. 30, 2021, pp. 1149-1153.

Sivaraman, et al., "Personalized Speech Enhancement through Self-Supervised Data Augmentation and Purification", In Proceedings of InterSpeech, Aug. 30, 2021, pp. 2676-2680.

Taal, et al., "An Algorithm for Intelligibility Prediction of Time-Frequency Weighted Noisy Speech", In Journal of IEEE Transactions on Audio, Speech, and Language Processing, vol. 19, Issue 7, Sep. 2011, pp. 2125-2136.

Taherian, et al., "One Model to Enhance Them All: Array Geometry Agnostic Multi-Channel Personalized Speech Enhancement", In Repository of arXiv:2110.10330v1, Oct. 20, 2021, 5 Pages.

Tolooshams, et al., "Channel-Attention Dense U-Net for Multichannel Speech Enhancement", In Proceedings of International Conference on Acoustics, Speech and Signal Processing, May 4, 2020, pp. 836-840.

Vaswani, et al., "Attention Is All You Need", In Proceedings of 31st Conference on Neural Information Processing Systems, Dec. 4, 2017, 11 Pages.

Wang, et al., "All-Neural Multi-Channel Speech Enhancement", In Proceedings of 19th Annual Conference of the International Speech Communication Association, Sep. 2, 2018, pp. 3234-3238.

Wang, et al., "Multi-microphone Complex Spectral Mapping for Utterance-wise and Continuous Speech Separation", In Journal of IEEE/ACM Transactions on Audio, Speech, and Language Processing, vol. 29, May 26, 2021, pp. 2001-2014.

Wang, et al., "Neural Speech Separation Using Spatially Distributed Microphones", In Proceedings of 21st Annual Conference of the International Speech Communication Association, Oct. 25, 2020, pp. 339-343.

Wang, et al., "Speech Separation using Speaker Inventory", In Proceedings of Automatic Speech Recognition and Understanding Workshop, Dec. 14, 2019, pp. 230-236.

Wang, et al., "Transformer-Based Acoustic Modeling for Hybrid Speech Recognition", In Proceedings of International Conference on Acoustics, Speech and Signal Processing, May 4, 2020, pp. 6874-6878.

Wang, et al., "VoiceFilter: Targeted Voice Separation by Speaker-Conditioned Spectrogram Masking", In Proceedings of 20th Annual Conference of the International Speech Communication Association, Sep. 15, 2019, pp. 2728-2732.

(56) References Cited

OTHER PUBLICATIONS

Wang, et al., "VoiceFilter-Lite: Streaming Targeted Voice Separation for On-Device Speech Recognition", In Proceedings of 21st Annual Conference of the International Speech Communication Association, Oct. 25, 2020, pp. 2677-2681.
Williamson, et al., "Complex Ratio Masking for Monaural Speech Separation", In Journal of IEEE/ACM Transactions on Audio, Speech, and Language Processing, vol. 24, Issue 3, Mar. 2016, pp. 483-492.
Woelfel, et al., "Distant Speech Recognition", Published by John Wiley & Sons, Apr. 17, 2009, 584 Pages.
Xiao, et al., "Single-channel Speech Extraction Using Speaker Inventory and Attention Network", In Proceedings of International Conference on Acoustics, Speech and Signal Processing, May 12, 2019, pp. 86-90.
Yemini, et al., "Scene-Agnostic Multi-Microphone Speech Dereverberation", In Proceedings of InterSpeech, Aug. 30, 2021, pp. 1129-1133.
Yin, et al., "Phasen: A Phase-and-Harmonics-Aware Speech Enhancement Network", In Proceedings of the Thirty-Fourth AAAI Conference on Artificial Intelligence, vol. 34, Issue 05, Feb. 7, 2020, pp. 9458-9465.
Zhang, et al., "Microphone Array Generalization for Multichannel Narrowband Deep Speech Enhancement", In Repository of arXiv:2107.12601v1, Jul. 27, 2021, 5 Pages.
Zhou, et al., "ResNext and Res2Net Structures for Speaker Verification", In Proceedings of Spoken Language Technology Workshop, Jan. 19, 2021, pp. 301-307.

* cited by examiner

ARRAY GEOMETRY AGNOSTIC MULTI-CHANNEL PERSONALIZED SPEECH ENHANCEMENT

CROSS-REFERENCE TO RELATED APPLICATION

This application claims the benefit of U.S. Provisional Patent Application Ser. No. 63/252,493 filed on Oct. 5, 2021 and entitled "Array Geometry Agnostic Multi-Channel Personalized Speech Enhancement", which is hereby incorporated by reference in its entirety for all intents and purposes.

BACKGROUND

Speech enhancement models are widely used in online communication tools that remove the background noise and let through the human speech. One limitation of some existing systems is that they cannot remove interfering speakers at least because they are trained to preserve all human speech, and those existing systems are not capable of selecting the target speaker. As such, those skilled in the art will note that while some existing systems describe speech enhancement, the speech enhancement in such existing systems may not include the capability of removing other speakers (e.g., interfering speakers).

With such existing systems, personal information of the household members can unintentionally be shared, such as during a video conferencing call. In addition, household members that work for different companies and share the same environment due to limited space could inadvertently leak company secrets.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples of array geometry agnostic multi-channel personalized speech enhancement (PSE) include: extracting speaker embeddings from enrollment data for at least a first target speaker; extracting spatial features from input audio captured by a microphone array, the input audio including a mixture of speech data of the first target speaker and an interfering speaker; providing the input audio, the extracted spatial features, and the extracted speaker embeddings to a trained geometry-agnostic PSE model; and using the trained geometry-agnostic PSE model without geometry information for the microphone array, producing output data, the output data comprising estimated clean speech data of the first target speaker with a reduction of speech data of the interfering speaker.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
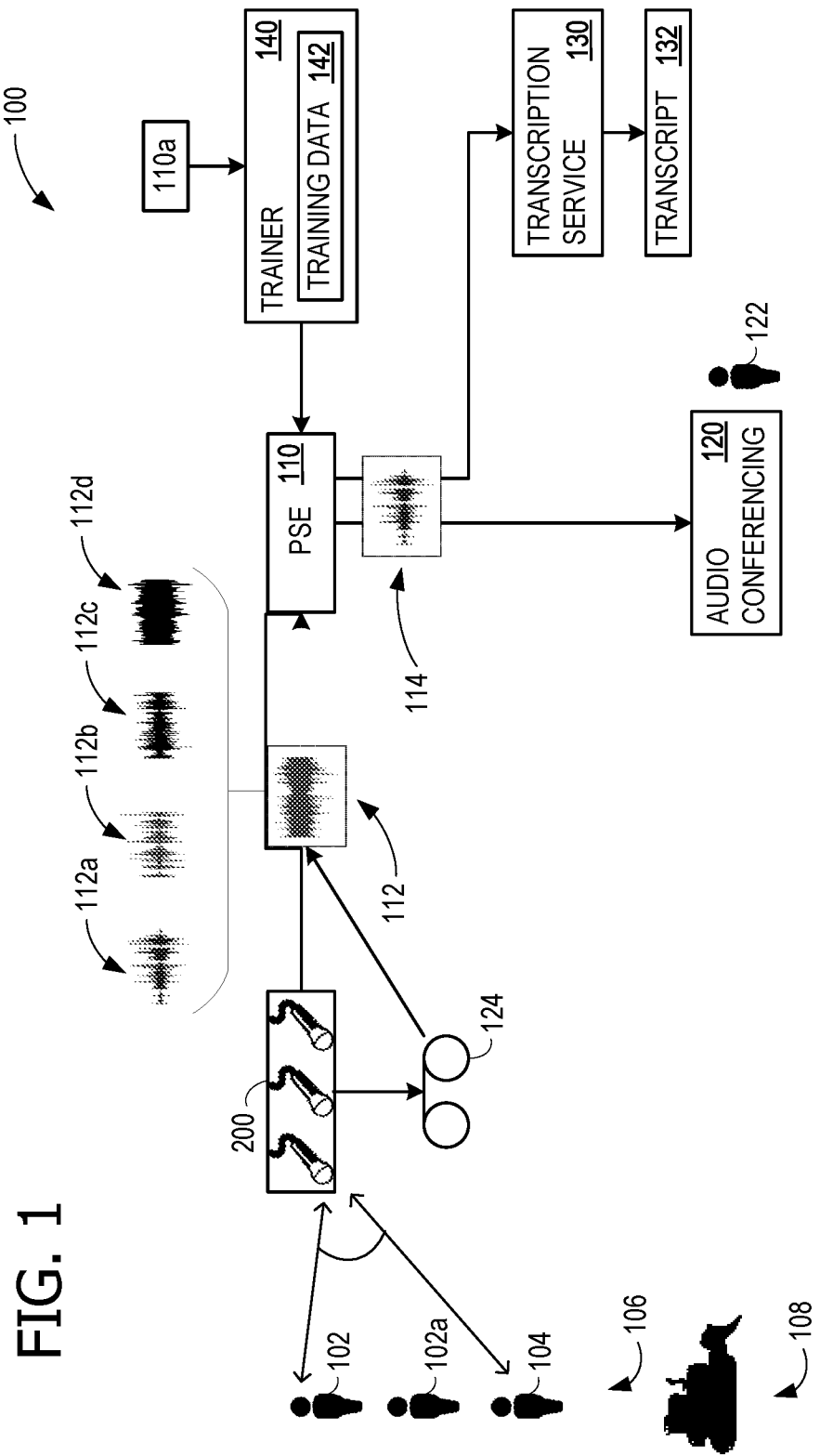
FIG. 1 illustrates an example arrangement that advantageously provides personalized speech enhancement (PSE), and in some examples, array geometry agnostic multi-channel PSE.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure describe both (i) array geometry agnostic multi-channel personalized speech enhancement (PSE) and (ii) multi-channel PSE (without the array geometry agnostic features).

Examples of array geometry agnostic multi-channel PSE include using a trained geometry-agnostic PSE model to process input audio data and produce output audio data, representing clean speech, in real-time. Some examples extract speaker embeddings from enrollment data for at least a first target speaker, and extract spatial features from input audio captured by a microphone array. The input audio includes a mixture of speech data of the first target speaker and an interfering speaker. The input audio, the extracted spatial features, and the extracted speaker embeddings are provided to the trained geometry-agnostic PSE model. Using the trained geometry-agnostic PSE model without geometry information for the microphone array, aspects of the disclosure produce output data comprising estimated clean speech data of the first target speaker with a reduction of speech data of the interfering speaker.

Examples of multi-channel PSE include extracting speaker embeddings from enrollment data for at least a first target speaker, and extracting spatial features from input audio captured by a microphone array. The input audio includes a mixture of speech data of the first target speaker and an interfering speaker. The input audio, the extracted spatial features, and the extracted speaker embeddings are provided to a trained PSE model. Using the trained PSE model, output data is produced comprising estimated clean speech data of the first target speaker with a reduction of speech data of the interfering speaker.

Aspects of the disclosure improve the operations of computing devices at least by improving computerized speech enhancement, specifically PSE that outputs estimated clean speech data of a target speaker with a reduction of speech data of an interfering speaker. Multi-channel PSE uses inputs from multiple microphones, and geometry agnostic operation indicates that the PSE solution does not need to know the positions of the microphones in order to reduce or eliminate non-speech noise and speech data of an interfering speaker. Since different users may use different models of computers that each have multiple microphone geometries, the benefits of this approach permit a single trained PSE model to be used on, for example, multiple different computers models without requiring training of the PSE model to be tailored for each specific computer model.

Aspects of the disclosure provide systems and methods for improved PSE, including, in some examples, personalized noise suppression and echo cancellation. The PSE described herein is capable of removing both the interfering speakers and environmental noises, providing speech enhancement that utilizes the enrollment data of the target speaker (e.g., around one minute, in some examples, although different examples are operable with longer and shorter intervals of input audio) and uses this enrollment data (e.g., cue) to isolate the target speaker's voice and filter out other audio. With PSE deployed to online communication tools, communication security and user privacy are improved by PSE filtering out voices of other household members. Additionally, PSE also improves communication efficiency and the user experience by removing background speakers that may be distracting during a meeting (e.g., an audio and/or video conference).

Some examples combine PSE and multi-channel processing. For example, a multi-channel PSE network may improves results compared with a single-channel PSE. In addition, training a PSE model in such a way that it functions with different multi-channel array geometries is disclosed. This permits the PSE model to be trained with a geometry agnostic approach, so that it functions with multi-channel (e.g., multi-microphone) hardware that had not been encountered during training (e.g., new hardware introduced to the market after training). This precludes the need to retrain PSE models for each variation of microphone array geometry that may be encountered, permitting use of the same array agnostic model for various microphone array geometries.

Some examples contemplate isolating more than a single target speaker. For example, enrollment data from two target speakers may be input into a trained PSE model. The two target speakers may be sharing a computer (using it at different times), co-presenting (using it at the same time), debating, hosting, etc. The PSE model filters out audio other than the audio matching the voices of the two enrolled target speakers. Examples may be run in real-time on standard personal computers (PCs).

FIG. 1 illustrates an example arrangement 100 that advantageously provides multi-channel PSE, and in some examples, array geometry agnostic multi-channel PSE. A microphone array 200 captures input audio 112, which may include a mixture of speech data 112a of a first target speaker 102, speech data 112b of a second target speaker 102a, speech data 112c of one or more interfering speakers 104 (together, a set of speakers 106), and background noise 112d from a noise source 108. An audio recorder 124 is used to record audio signals for when PSE is applied to recorded audio. PSE is performed by a trained PSE model 110, which outputs output data 114, which includes estimated clean speech data of enrolled target speaker(s), such as target speaker 102 and (in some examples) also target speaker 102a. In some examples, output data 114 includes audio data, which may be used in an audio conferencing arrangement 120, so that remote user 122 is able to hear target speakers 102 and 102a clearly over interfering speaker 104 and noise source 108f.

As indicated, there may be angular differences between target speaker 102 and interfering speaker 104, which will manifest in a time difference of arrival (TDoA) for the speech from each speaker arriving at the different microphones of microphone array 200. In some examples, target speaker 102 may be at a range of 0.3 to 1.3 meters away from a single channel microphone arrangement (e.g., microphone array 200 is reduced to just a single microphone), while interfering speaker 104 may be in excess of 2 meters away from the microphone, resulting in a voice volume of interfering speaker 104 that is 0 to 10 decibels (dB) lower than the voice volume of target speaker 102. In some examples, target speaker 102 may be at a range of 0.5 to 2.5 meters away from a multi-channel microphone arrangement, with interfering speaker 104 being at approximately the same distance.

In some examples, output data 114 includes a transcript 132, produced by a transcription service 130. In some examples, transcription service 130 employs speech recognition, which is included in trained PSE model 110. Trained PSE model 110 is thus valuable in improving accuracy and completeness of transcript 132 by shielding transcription service 130 from confusing input, such as speech data 112c (from interfering speaker 104) and background noise 112d. Thus, arrangement 100 may be used for live audio conferencing (real-time PSE) and recorded audio (post-processing) to improve speech quality, and also real-time transcription and transcription of recorded audio.

A trainer 140 uses training data 142, which may be tagged audio data (e.g., audio clips annotated with ground truth data), to train an input PSE model 110a. In some example, trainer 140 provides multi-task (MT) training, such that trained PSE model 110 is able to perform echo cancelation in addition to PSE.

Figure 2:
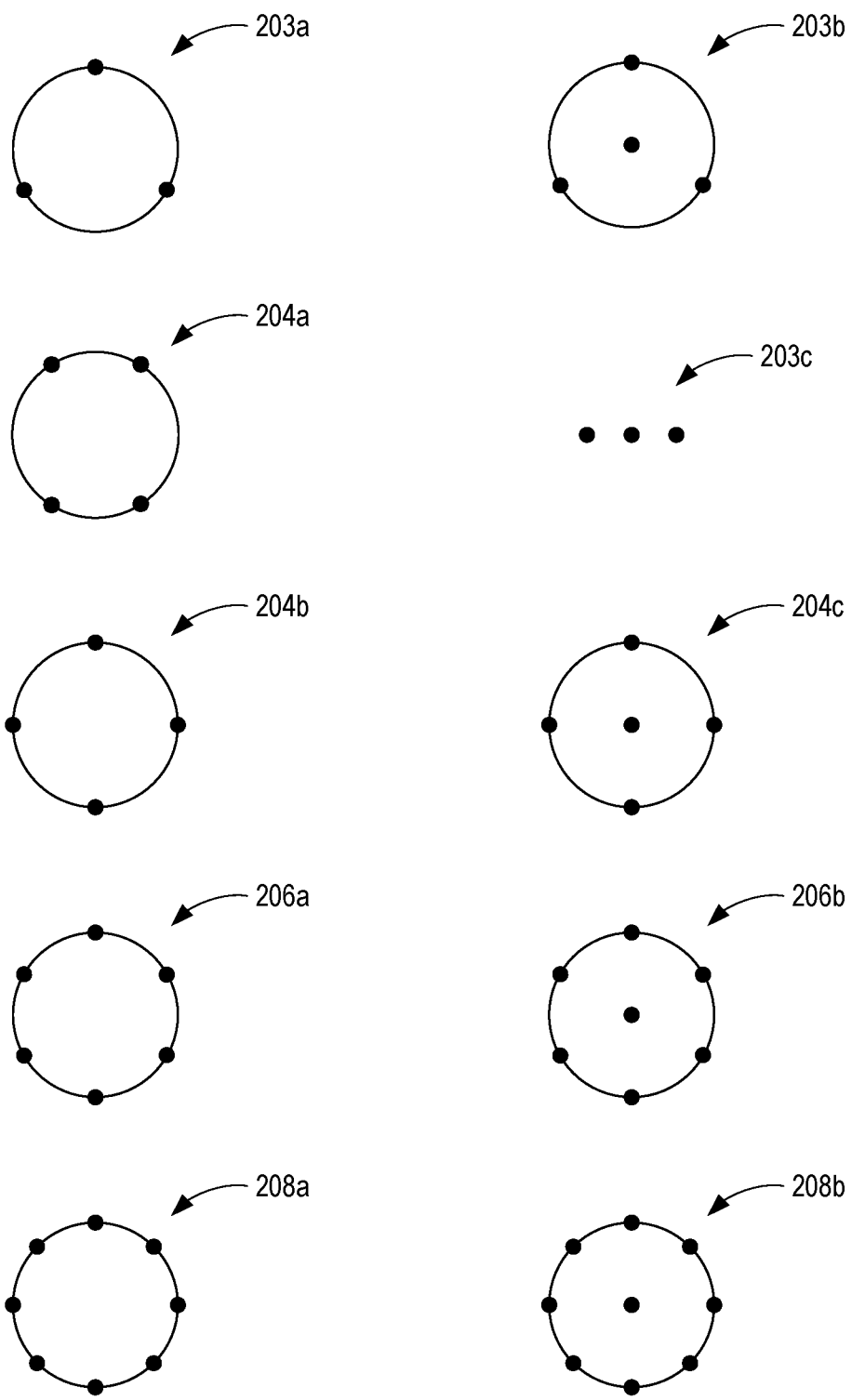
FIG. 2 illustrates various exemplary microphone array geometries that may be used in the arrangement of FIG. 1.

FIG. 2 illustrates various exemplary microphone array geometries that may be used in arrangement 100, with each dot representing a microphone, and the circles merely representing a notional alignment reference. These arrangements may be used during training and/or operation, with the understanding that examples of the disclosure permit different microphone array geometries to be used during operation (use of the trained model) than had been used for training, due to the trained model being operable with any geometry dependence. It should be further understood that a wide variation of other microphone array geometries may be used, including with different numbers of microphones and irregular spacing, and that FIG. 2 is merely exemplary.

Microphone array geometry 203a is a 3-channel circular array, and microphone array geometry 203b is a variation of microphone array geometry 203a with an additional center microphone. Microphone array geometry 203c is a 3-channel linear array. Microphone array geometry 204a is a 4-channel rectangular array. Microphone array geometry 204b is a 4-channel circular array, and microphone array geometry 204c is a variation of microphone array geometry 204b with an additional center microphone. Microphone array geometry 206a is a 6-channel circular array, and microphone array geometry 206b is a variation of microphone array geometry 206a with an additional center microphone. Microphone array geometry 208a is an 8-channel circular array, and microphone array geometry 208b is a variation of microphone array geometry 208a with an additional center microphone. Other circular arrays with, for example 5 and 7 microphones may also be used, along with other shapes and numbers of microphones. Distances between microphones may vary between 3 and 10 centimeters (cm), and the radii of the array circles may also vary on approximately the same scale.

Examples of the disclosure use deep neural networks (DNNs) for PSE and are causal, processing only past frames. A metric measures the target speaker over-suppression (TSOS), which assists in developing PSE models. MT training with a speech recognition back-end may assist to render PSE models robust against TSOS. Examples are thus able to provide improved transcription and speech quality.

TSOS is a common limitation of PSE models. Due to inherent ambiguity of speaker embedding, PSE models, especially causal ones, may sometimes become confused and remove the target speaker's voice, rather than background noise and interfering speakers. The TSOS issue may be even more severe for communication, for example when the target speaker's voice is suppressed, even for a short period. Aspects of the disclosure provide a method to measure the TSOS reliably to provide methods to reduce or remove it.

Two DNNs for PSE are described: 1) converting a deep complex convolutional recurrent network (DCCRN) model designed for unconditional speech enhancement (SE) to PSE, identified as personalized DCCRN (pDCCRN), and 2) an architecture that yields superior performance than the baseline and pDCCRN models, identified as personalized deep convolution attention U-Net (pDCATTUNET). In some examples, the pDCATTUNET architecture contains an encoder and decoder with 2-D convolutions and U-net-style skip connections.

In some examples, conversion of the DCCRN includes introducing the d-vector as an input to the original DCCRN architecture. Multiple configurations are possible, such as concatenating the d-vectors to the input of a complex long term short term memory (LSTM) layer (see FIG. 7). For example, the d-vectors are concatenated to the real and imaginary parts of the tensors coming from the last layer of the encoder, and fed to a complex LSTM. This modification increases the input size of the complex LSTM layer only; minimizing the additional computational cost. This model is referred to as pDCCRN.

Test sets may be used to measure different aspects of the PSE models. A metric identified as TSOS measure estimates the over-suppression issue. Automatic speech recognition (ASR) based MT training may reduce the frequency of TSOS. Experiments on some examples show that the model pDCATTUNET yields superior speech and transcription quality with a lower TSOS percentage compared with other architectures and pDCCRN models. The positive effects of an asymmetric loss function on the TSOS issue are thus validated. MT training may further improve transcription quality and reduce the TSOS percentage with limited speech quality degradation.

Figure 3:
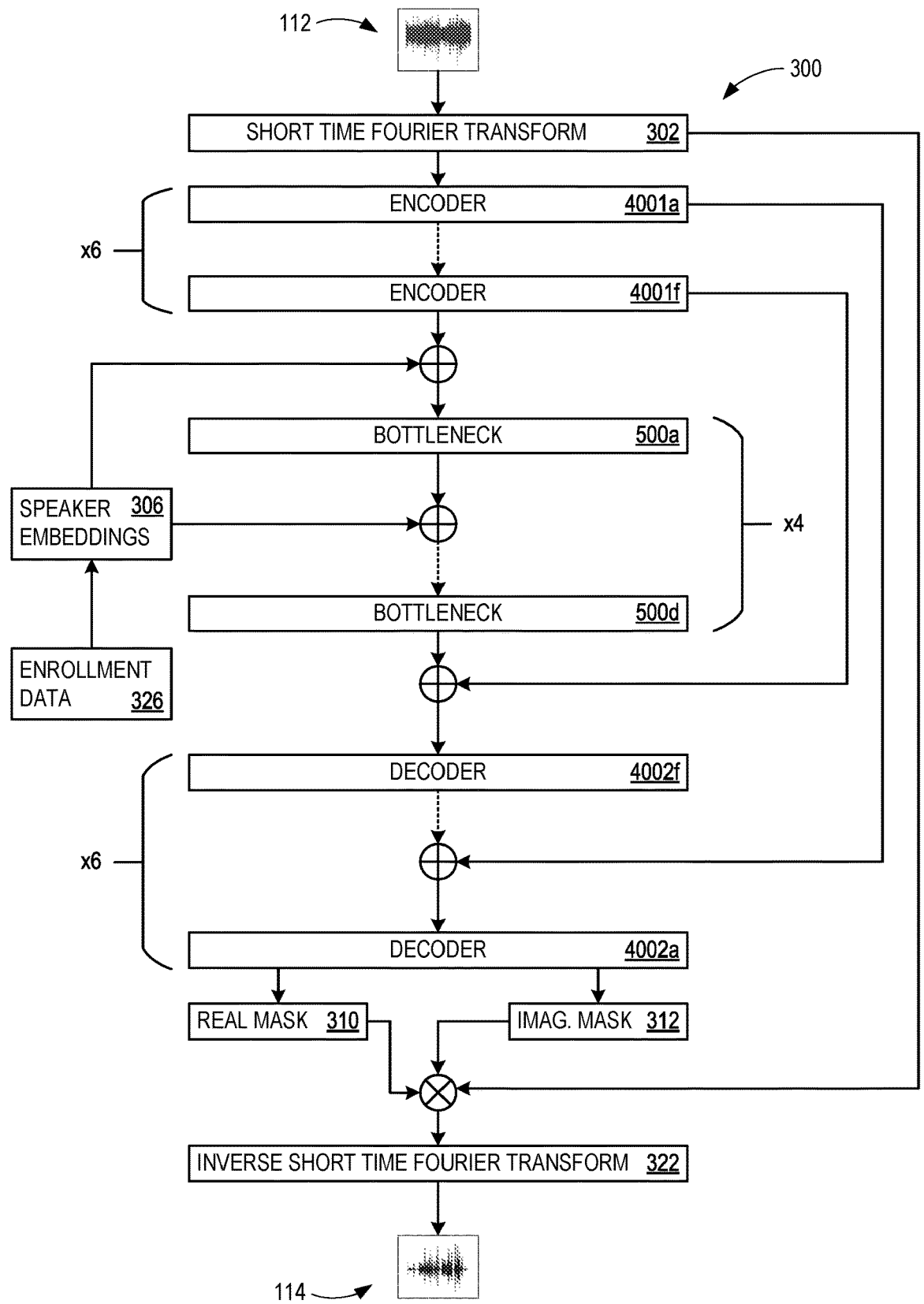
FIG. 3 illustrates an example architecture for a PSE model that may be used in the arrangement of FIG. 1.

FIG. 3 illustrates an example architecture 300 for a PSE model that may be used in arrangement 100, for example when trained PSE model 110 comprises a multi-channel personalized noise suppression (MCPNS) model. In some examples, pDCATTUNET is implemented using architecture 300. Input audio 112 is provided to an STFT block 302, and then a series of N encoder blocks 4001a-4001f, where N=6 is indicated, encoder block 4001a is the initial encoder block and encoder block 4001a is the final encoder block. The speaker embeddings 308 (d-vector) are extracted from enrollment data for target speaker 102 (and also, in some examples, target speaker 102a) and concatenated with the output from final encoder block 4001f. The d-vectors represent the acoustic characteristics of a target speaker. In some examples, a pre-trained Res2Net speaker ID model is used for d-vector extraction. Further detail for encoder blocks 4001a and 4001f is provided in relation to FIG. 4.

The combination of the output from the final encoder block 4001f and speaker embeddings 308 (d-vector) is provided to a bottleneck block 500a, and speaker embeddings 308 is further concatenated with the output of bottleneck block 500a. This example arrangement is repeated four times, as indicated, until reaching the output of the final bottleneck block 500d, which is input to an initial decoder block 4002f. The output of final encoder block 4001f is concatenated with the output of bottleneck block 500a to form the input to initial decoder block 4002f. This structure is repeated N times (N=6), unwinding the encoding/decoding, such that the output of encoder block 4001a is concatenated with the output of the penultimate decoder block to form the input to final decoder block 4002a. Further detail for decoder blocks 4002a and 4002f is also provided in relation to FIG. 4, and further detail for bottleneck blocks 500a and 500d is provided in relation to FIG. 5.

A single-channel PSE model (e.g., architecture 300) performs complex spectral mapping based on pDCCRN. A pDCCRN approach uses a U-Net architecture with encoder and decoder blocks and two complex LSTM layers in-between. Each block contains complex 2-D convolutional layers followed by complex batch normalization. Complex layers are formed by two separate real-valued layers that operate on the real and imaginary parts of the layer input. The pDCCRN uses a d-vector and the mixture signal Y in the short-time Fourier transform (STFT) domain. The real and imaginary parts of the mixture signal are concatenated and are fed as the input, shown in Eq. (1):

$$x \in \mathbb{R}^{C \times 2F \times T} \qquad \text{Eq (1)}$$

where C, F, and T are the number of channels, frequency bins, and time frames, respectively.

In some examples, the d-vector is replicated through time dimension, concatenated with the encoder's output, and fed into a first LSTM layer. The model outputs a complex ratio mask which is multiplied with the input mixture to estimate the clean speech. Six encoder layers are used with C=[16; 32; 64; 128; 128; 128], kernel size of 5×2 and stride of 2×1. The model is trained with a power-law compressed phase-aware mean-squared error (MSE) loss function. Operations are causal and may operate in real-time.

Figure 4:
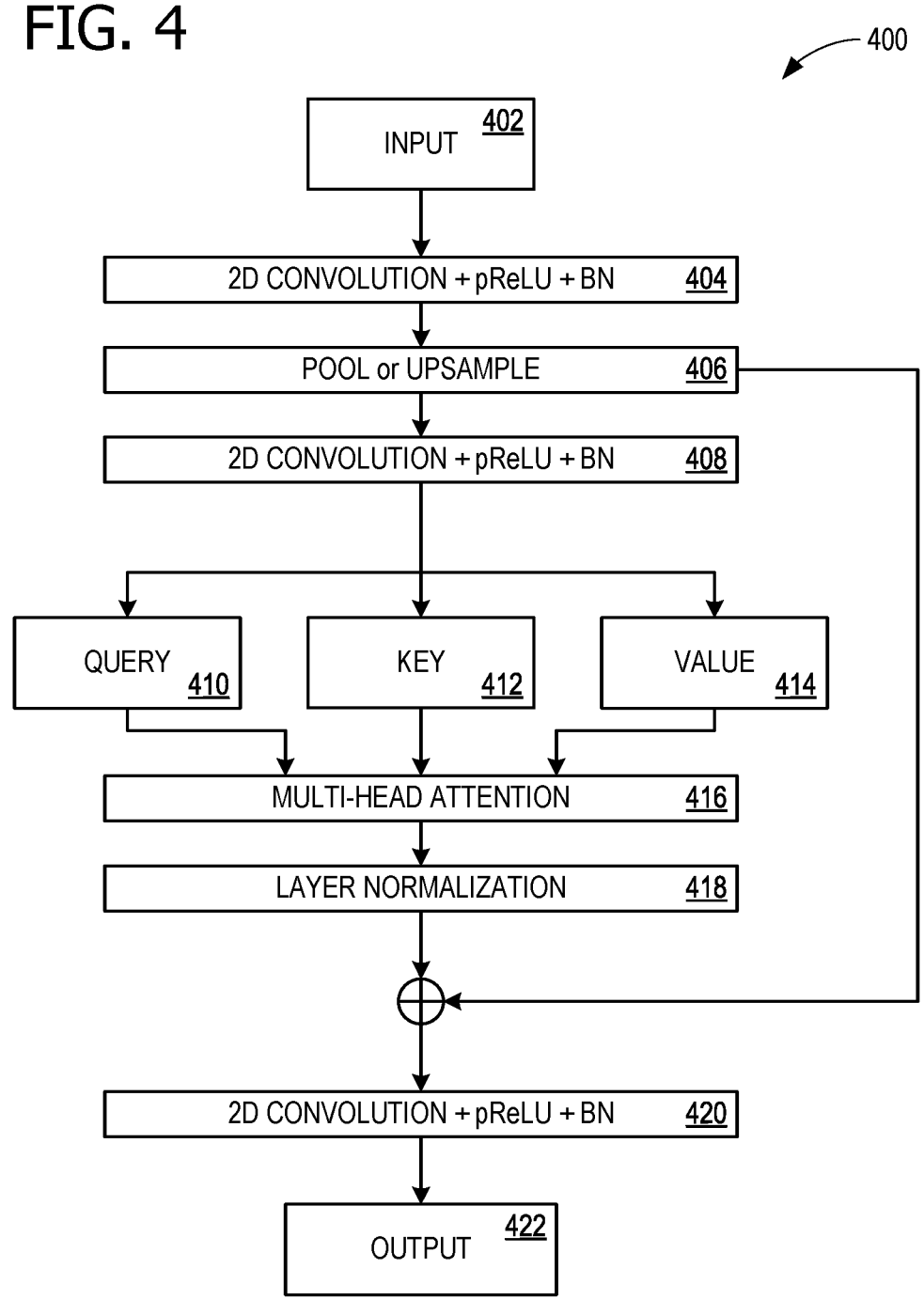
FIG. 4 illustrates an example encoder/decoder that may be used in various architectures described herein.

FIG. 4 illustrates an example encoder/decoder that may be used in various architectures described herein, for example as encoder blocks 4001a and 4001f, and decoder blocks 4002a and 4002f. A decoder performs an inverse of an encoder. The example encoder and decoder architectures include convolution layers and are supported by temporal modeling. The encoder/decoder blocks feed their input to a convolution layer with a two-dimensional (2-D) kernel, and it is followed by a parametric rectified linear unit (pReLU) and batch normalization (BN). For simplicity, the combination of convolution layer followed by pReLU and BN is referred to as "convolution block". Input 402 is provided to block 404, which performs 2-D convolution, and provides a pPReLU and BN.

A pPReLU is an activation function that generalizes a traditional rectified linear activation function with a slope for negative values. A rectified linear activation function is a piecewise linear function that output the input directly if input is positive and zero if the input is negative. BN is used with deep neural networks to standardize inputs to a layer for each mini-batch, in order to reduce the number of training epochs required.

To process inputs with different dimensions, stream pooling layers are introduced for convolutional neural networks that are only based on the averaging and concatenation of the feature maps. Block 404 is followed by block 406, which is a max-pooling layer for encoders and a nearest-neighbor upsampling layer for decoders. Downsampling and upsampling operations are applied to the frequency dimension. Another convolution block 408 processes the results from block 406 and outputs three channels: query (Q) 410, key (K) 412, and value (V) 414. These intermediate spectrograms are used as query, key, and value for multi-head attention module 416, Multihead(Q, K, V), which uses a causal attention mask.

Multi-head attention is a module for attention mechanisms that runs through an attention mechanism several times in parallel. Multiple attention heads allows for attending to parts of a sequence differently (e.g., longer-term dependencies versus shorter-term dependencies). The output of multi-head attention module 416 is normalized by a layer normalization 418 and concatenated to the intermediate results coming from block 406 (e.g., from the first convolution block). A third convolution block 420 takes the concatenated results as input and sends its output 422 to the next layer.

Figure 5:
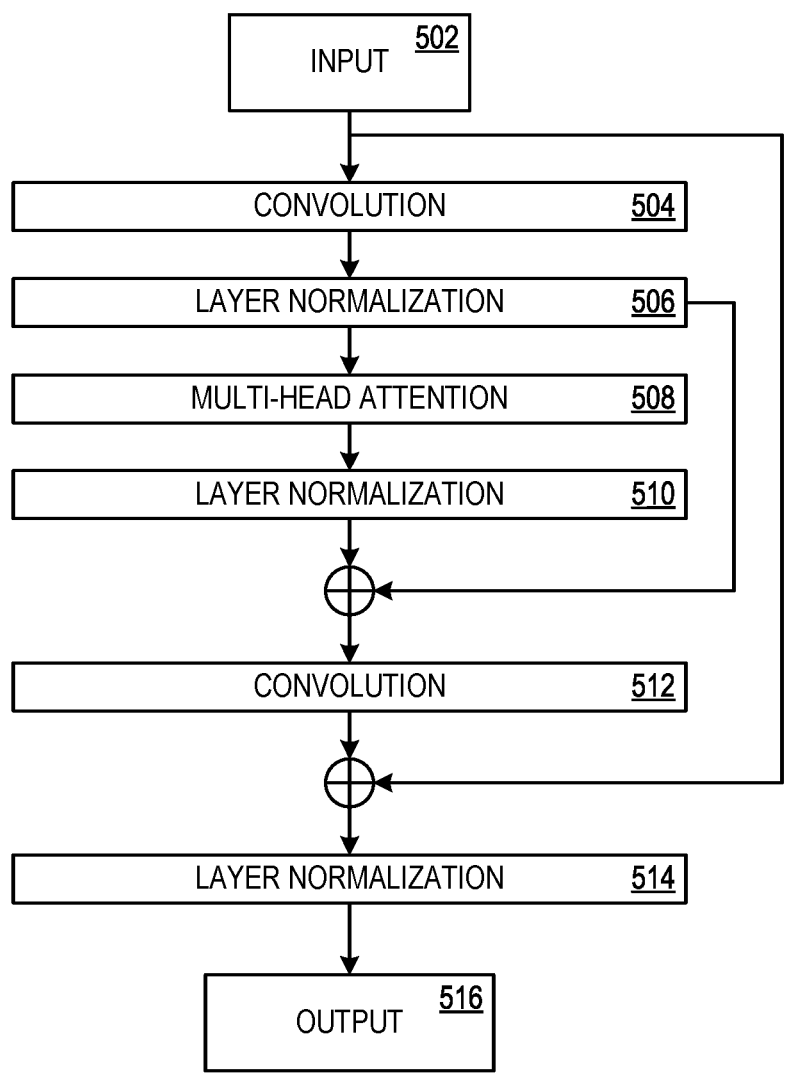
FIG. 5 illustrates an example bottleneck block that may be used in various architectures described herein.

FIG. 5 illustrates an example bottleneck block 500 that may be used in various architectures described herein, for example as bottleneck blocks 500a and 500d. Unlike recurrent neural network (RNN) based bottlenecks, bottleneck block 500 is designed using convolution layers with one-dimensional (1-D) kernels and multi-head attention modules. Input 502 to bottleneck block 500 is processed by a convolution layer followed by a PReLU (block 504) and a layer normalization 506. The intermediate results are fed to a multi-head attention module 508, followed by a layer normalization 510. There is a skip connection (summation) between the output of multi-head attention+layer normalization (multi-head attention module 508 and layer normalization layer 510) and another convolution layer+PReLU layer (block 512). It follows with a second skip connection: input 502 of bottleneck block 500 is summed with the output of the second convolution block 512. A layer normalization 514 is applied, and the output 516 is sent to the next layer.

Referring back to FIG. 3, 1-D batch normalization is applied to real and imaginary parts of the spectrogram after the STFT (STFT block 302). The network's input is the concatenation of the real and imaginary parts of the STFT, channel-wise, resulting in a four-dimensional (4-D) tensor including a batch dimension. After predicting the real and imaginary parts of the mask (real mask 310, an imaginary mask 312, respectively), the complex ratio mask is applied to the original real and imaginary parts of the noisy spectrogram (e.g., the output of decoder block 4002a) to produce output data 114. In some examples, further filtering (e.g., bandpass) is performed.

For training architecture 300, for example with trainer 140, a loss function is determined. A power-law compressed phase-aware (PLCPA) loss function is effective for both ASR and speech quality improvement, and is defined as:

$$\mathcal{L}_a(t,f) = \left||S(t,f)|^p - |\hat{S}(t,f)|^p\right|^2 \quad \text{Eq. (2)}$$

$$\mathcal{L}_p(t,f) = \left||S(t,f)|^p e^{j\varphi(S(t,f))} - |\hat{S}(t,f)|^p e^{j\varphi(\hat{S}(t,f))}\right|^2$$

$$\mathcal{L}_{PLCPA} = \frac{1}{T}\frac{1}{F}\sum_t^T \sum_f^F (\alpha \mathcal{L}_a(t,f) + (1-\alpha)\mathcal{L}_p(t,f))$$

where S and Ŝ are the estimated and reference (clean) spectrograms, respectively. Parameters t and f represent the time and frequency index, while T and F stand for the total time and frequency frames, respectively. Hyper-parameter p is a spectral compression factor and is set to 0.3 in some examples. Operator φ calculates the argument of a complex number. Parameter α is the weighting coefficient between the amplitude and phase-aware components.

To alleviate the over-suppression (OS) issue, asymmetric loss is adapted to the amplitude part of the loss function defined by Eq. (2). The asymmetric loss penalizes the T-F bins where the target speaker's voice is removed. The power-law compressed phase-aware asymmetric (PLCPA-ASYM) loss function is defined as:

$$h(x) = \begin{cases} 0, & \text{if } x \leq 0 \\ x, & \text{if } x > 0 \end{cases} \quad \text{Eq. (3)}$$

$$\mathcal{L}_{OS}(t,f) = \left|h(|S(t,f)|^p - |\hat{S}(t,f)|^p)\right|^2$$

$$\mathcal{L}_{PLCPA-ASYM} = \mathcal{L}_{PLCPA} + \beta \frac{1}{T}\frac{1}{F}\sum_t^T \sum_f^F \mathcal{L}_{OS}(t,f)$$

where β is the positive weighting coefficient for $L_{OS}$. Furthermore, multi-task (MT) training is adapted using a frozen ASR back-end to update the parameters of the PSE network. Without enrollment data for the ASR data, the d-vectors are extracted directly from the enhanced utterance. The MT loss is denoted as $L_{MT}$.

Figure 6:
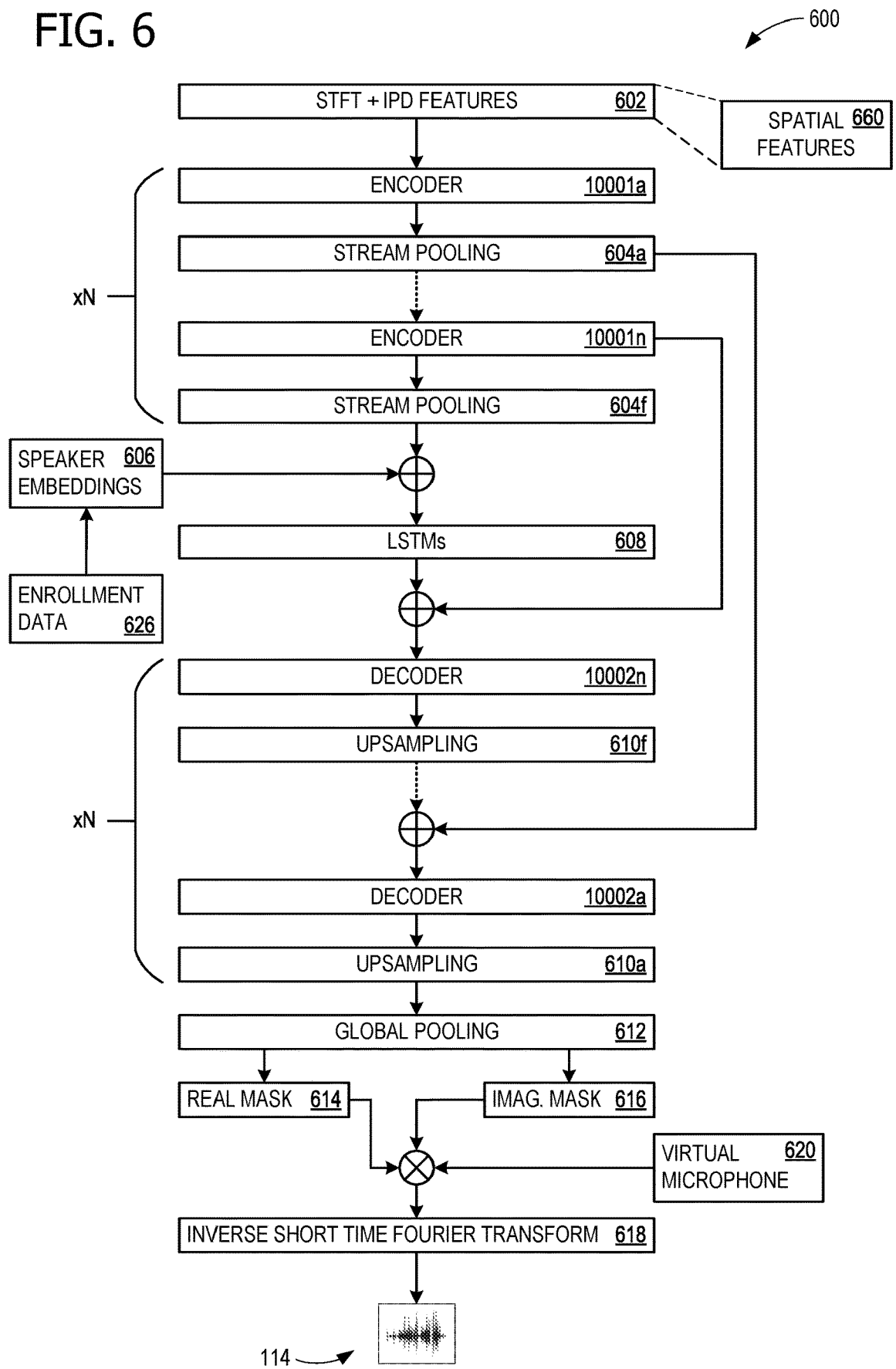
FIG. 6 illustrates an example architecture for a PSE model that may be used in the arrangement of FIG. 1.

FIG. 6 illustrates an example architecture 600 for trained PSE model 110 that may also be used in arrangement 100 as a version of trained PSE model 110. Architecture 600 leverages spatial features 660 to further improve the ability to distinguish between target speaker 102 and interfering speaker 104. In some examples, inter-channel phase difference (IPD) captures the relative phase difference between microphones of microphone array 200, which reflects the TDoA for different microphones, based on different angles to microphone array of target speaker 102 and interfering speaker 104.

Spatial information afforded by microphone array 200 is thus leveraged to improve PSE performance further. The relative importance of speaker embeddings and spatial features with various speaker placements for a causal array-geometry-agnostic multi-channel PSE model (architecture 600) described in relation so FIGS. 6-9. Examples may use different numbers of microphones and performance may be invariant to channel permutation. Experimental results (described following the description of FIG. 10B) demonstrate that geometry agnostic models generally outperform models trained on specific microphone array geometries for both speech quality and ASR accuracy. The effectiveness of the disclosed approach for unseen array geometries is also demonstrated.

In some examples of the disclosure, speech enhancement (SE) performance may be improved further by using microphone arrays, such as microphone array 200. With multiple microphones, spatial information may be extracted and combined with spectral information for obtaining superior SE models. The disclosure below extends PSE to utilize the microphone arrays for environments where strong noise, reverberation, and an interfering speaker are present. The combination of the enrolled speaker embedding and the spatial features significantly improves SE performance. The impact of speaker embeddings and spatial features are examined in challenging conditions where target and interfering speakers have similar angles or distances to the microphone array.

In addition, an array geometry agnostic PSE model is disclosed that works regardless of the number of microphones and the array shape. An advantage of this model is the simplification of the development process: the model is trained once and used across multiple microphone array devices without needing to train the model for each user device model (e.g., different models of notebook computers, with different numbers and/or placement of microphones). The geometry agnostic model yields consistent improvements over a model that is trained on specific array geometry. Furthermore, the effectiveness of the proposed geometry agnostic model for unseen array geometries is also described below. To process inputs with different dimensions, stream pooling layers are introduced for convolutional neural networks that are based on the averaging and concatenation of the feature maps.

In some examples, multiple approaches are employed to extend a single-channel PSE model to M microphones with a fixed array geometry. In one approach, real and imaginary parts of short time Fourier transform (STFT) values for all microphones are stacked in the channel dimension to create the input shown in Eq. (4) and fed to a multi-channel PSE model, as shown in FIGS. 6-9.

$$x \in \mathbb{R}^{M \times 2F \times T} \qquad \text{Eq(4)}$$

This input is fed into the PSE model. Note the similarity between Eq. (4) and Eq. (1). With this extension, the PSE model is able to implicitly learn the spectral and spatial information from the microphone array.

In another approach, spatial information is explicitly extracted. IPD is used for the spatial features and is defined for the microphone pair (i, j) and a mixture signal Y as:

$$\Phi_{i,j} = \angle\left(\frac{Y_i}{Y_j}\right) \qquad \text{Eq. (5)}$$

The first microphone is paired with the rest of the microphones to extract M−1 IPD features. The cosine and sine values of the IPD features are stacked with the real and imaginary parts of the first microphone STFT, respectively, to form the input shown in Eq. 4). The estimated mask is applied to the first microphone in both approaches.

In some examples, the PSE model is adaptable at run-time (e.g., on the platform device) based on the use of a speaker profile, adapted to device audio geometry, and supports acoustic echo cancellation. For example, for the echo cancellation, with additional input of reference audio (e.g., loopback audio) feature, the PSE model may be trained to perform echo cancellation in addition to PSE.

Unlike fixed geometry PSE models, array geometry agnostic multi-channel PSE models are trained with different array geometries. The virtual microphone signal $Y_v$ is created by taking the average of all microphones of a microphone array (e.g., microphone array 200), and given as:

$$Y_v = \frac{1}{M}\sum_{i=1}^{M} Y_i \qquad \text{Eq. (6)}$$

The IPD features (e.g., spatial features 660) for each microphone with respect to the virtual microphone are extracted from:

$$\Phi_{i,v} = \angle\left(\frac{Y_i}{Y_v}\right) \qquad \text{Eq. (7)}$$

In some examples, the IPD features are normalized using an unbiased exponentially weighted moving average to increase the robustness of the model to arbitrary array geometries. In the geometry agnostic model, a fourth dimension that contains specific stream (microphone) information is introduced. The model input of Eq. (4) contains STFT and IPD features of each stream in the channel dimension (e.g., C=2). FIG. 6 illustrates geometry agnostic model architecture 600. Each stream information is processed independently using pDCCRN. To utilize the spatio-temporal patterns exhibited in the input multichannel audio, a stream pooling layer is included after the encoder and decoder blocks of pDCCRN. In the stream pooling layers, the channel dimension are split into two parts of stream-specific and cross-stream information. The average across cross-stream channel is calculated and then concatenated to the stream-specific part of each stream. At the output layer of pDCCRN, a global-pooling layer is used to average across the streams and channels to estimate a complex mask. The estimated complex mask is applied to the STFT for virtual microphone signal $Y_v$.

In FIG. 6A, block 602 represents STFT (Eq. (4)) and IPD features (Eq. (7)) for each channel in microphone array 200. These are fed to an encoder block 10001a, followed by a stream pooling layer 604a. This is the first stage of N encoder blocks (N=6, in this example), concluding with an encoder block 10001f, followed by a stream pooling layer 604f. The output of the final stream pooling layer 604f is concatenated with speaker embeddings 606 (e.g., extracted from enrollment data 626 captured by multi-channel microphone array 200), and is fed into complex LSTM 608. In some examples, LSTM 608 includes a dense layer. Encoder blocks 10001a and 10001f are versions of complex encoder/decoder block 1000 of FIG. 10A.

The output from LSTM 608 is concatenated with the output from encoder block 10001f and fed to a decoder block 10002f, which is followed by an upsampling block 610f. There are N stages (N=6, in this example), concluding with an encoder block 10001a, followed by an upsampling block 610a. Similarly to architecture 300, the encoding/decoding is unwound, such that the output of encoder block 10001a is concatenated with the output of the penultimate upsampling block to form the input to final decoder block 10002a. Decoder blocks 10002a and 10002f are versions of complex encoder/decoder block 1000 of FIG. 10A. A global pooling layer 612 follows upsampling block 610a. A real mask 614, an imaginary mask 616, and virtual microphone signal $Y_v$ 620 (Eq. 6) are combined (e.g., by concatenation), and fed into an inverse STFT block 618 to produce output data 114.

In this manner the estimated mask is applied to the virtual microphone. In some examples, further filtering (e.g., bandpass) is performed.

Figure 7:
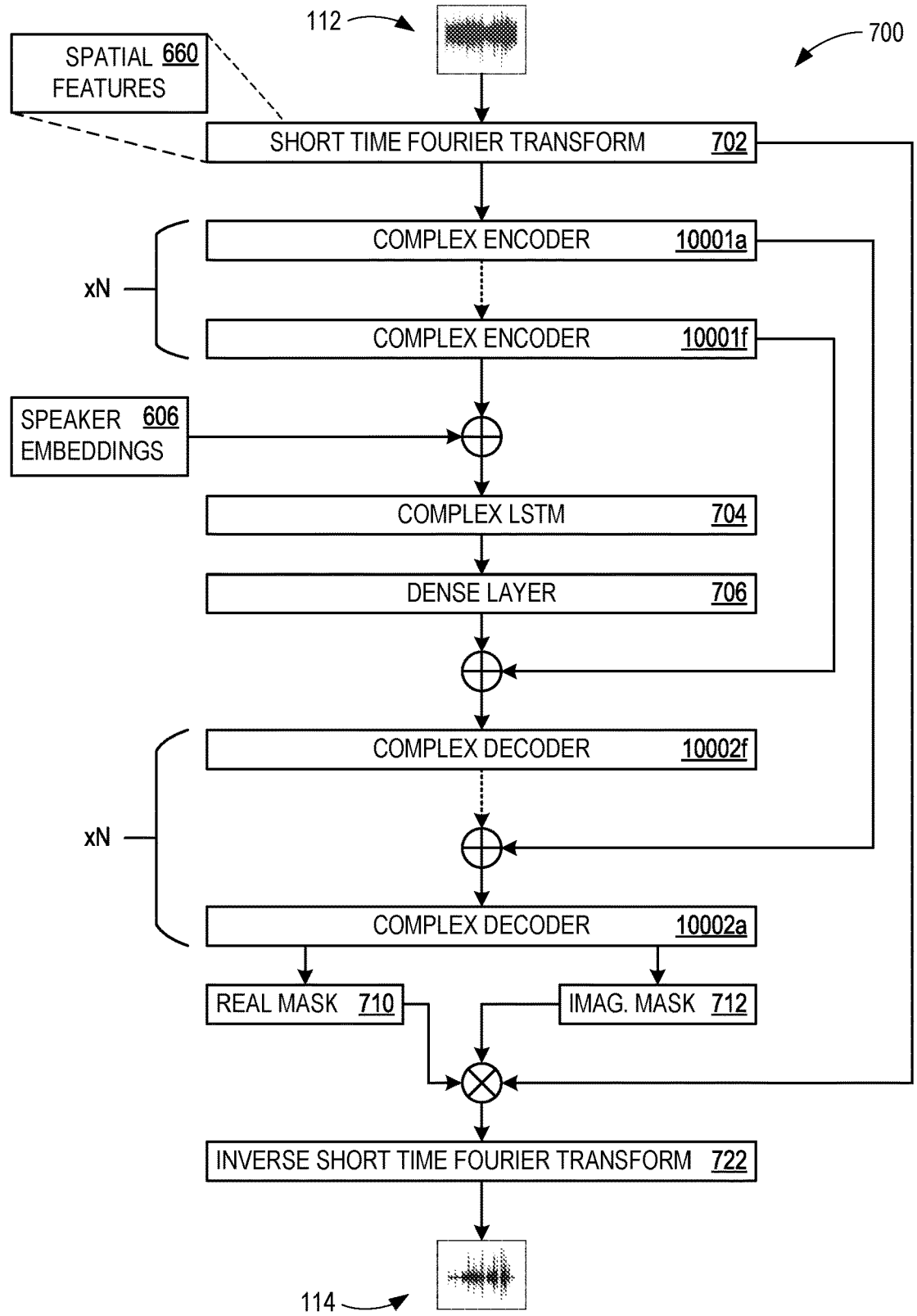
FIG. 7 illustrates another example architecture for a PSE model that may be used in the arrangement of FIG. 1.

FIG. 7 illustrates an example architecture 700 for trained PSE model 110 that may be used in arrangement 100, and comprises an example of a personalized DCCRN. Block 702 represents STFT (Eq. (4)) and IPD features (Eq. (7)) for each channel in microphone array 200. These are fed to encoder block 10001a (encoder blocks each may be followed by a stream pooling layer, as shown in FIG. 6). This is the first stage of N encoder blocks (N=6, in this example), concluding with an encoder block 10001f. The output of the encoder blocks is concatenated with speaker embeddings 606, and is fed into complex LSTM 704. For example, the d-vectors are concatenated to the real and imaginary parts of the tensors coming from the last layer of the final encoder, and fed to the complex LSTM. This approach increases the input size of the complex LSTM layer only; minimizing the additional computational cost.

The output of complex LSTM 704 is adjusted by a dense layer 706. A dense layer is a common, regular deeply-connected neural network layer, and is used when the output of an LSTM is not a softmax (e.g., a normalized exponential function). The output from LSTM 704 (as adjusted by dense layer 706) is concatenated with the output from encoder block 10001f and fed to a decoder block 10002f (which may be followed by an upsampling block, as shown in FIG. 6). There are N stages (N=6, in this example), concluding with encoder block 10001a (which may also be followed by an upsampling block). Similarly to architectures 300 and 600, the encoding/decoding is unwound, such that the output of encoder block 10001a is concatenated with the output of the penultimate upsampling block to form the input to final decoder block 10002a. In some examples, global pooling layer follows decoder block 10002a (as shown in FIG. 6). A real mask 710, an imaginary mask 712, and the STFT and IPD features from block 702 are combined (e.g., by concatenation), and fed into an inverse STFT block 722 to produce output data 114. In some examples, further filtering (e.g., bandpass) is performed.

Figure 8:
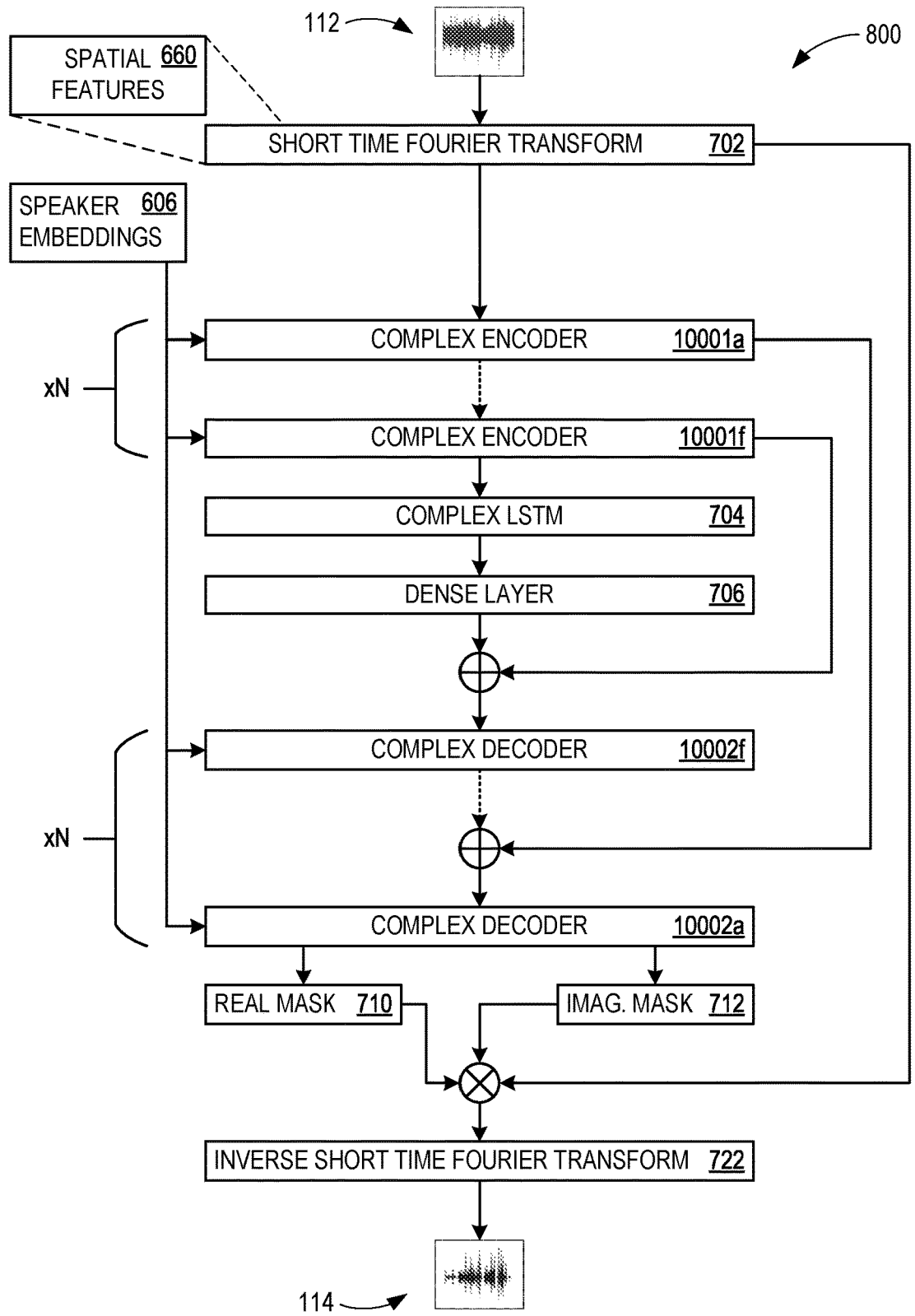
FIG. 8 illustrates another example architecture for a PSE model that may be used in the arrangement of FIG. 1.
Figure 9:
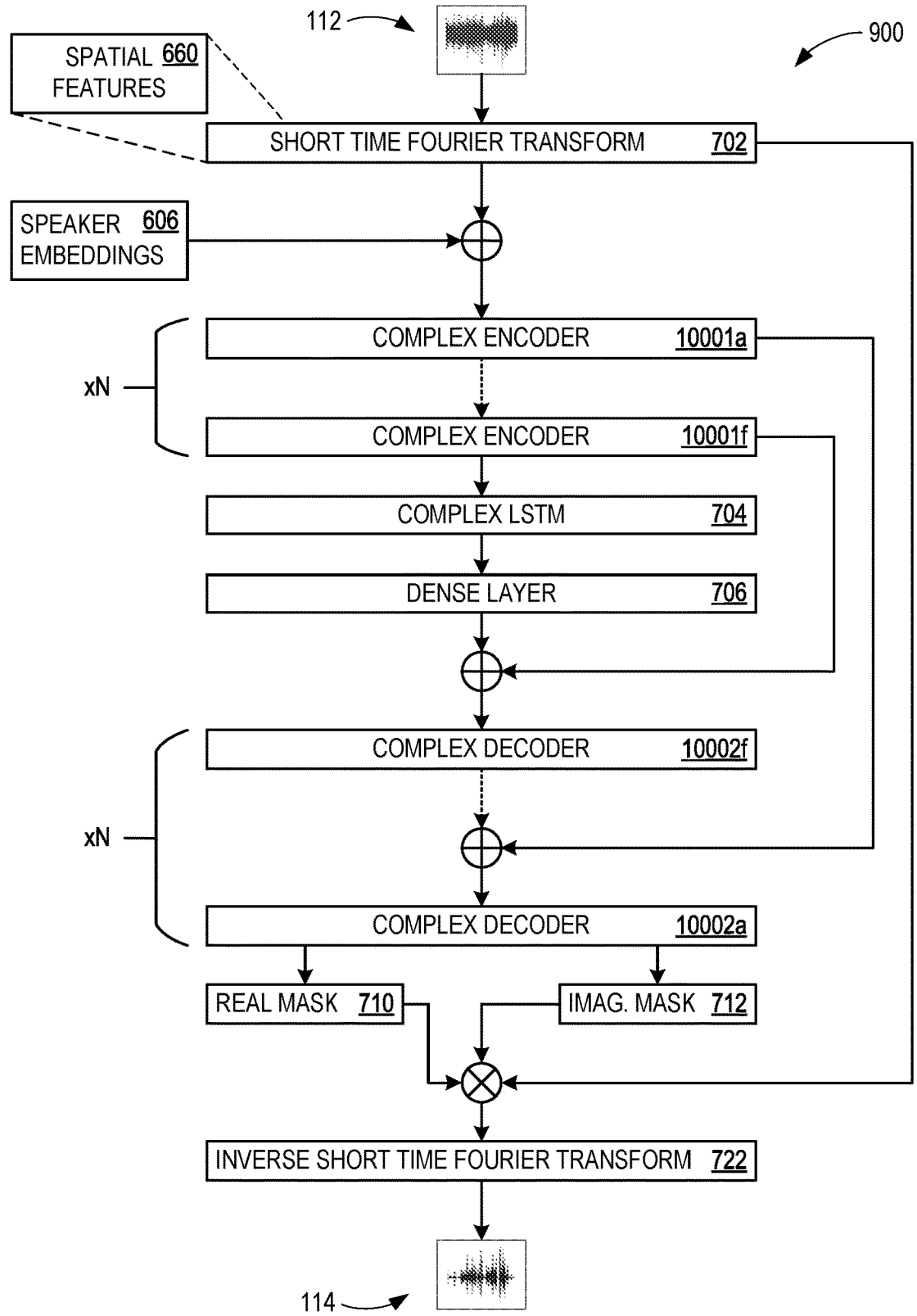
FIG. 9 illustrates another example architecture for a PSE model that may be used in the arrangement of FIG. 1.

FIG. 8 illustrates an example architecture 800 that may be used in arrangement 100 in place of architecture 700. In architecture 800, speaker embeddings 606 are introduced into each complex encoder and complex decoder, rather than only just prior to complex LSTM 704. FIG. 9 illustrates an example architecture 900 that may be used in arrangement 100 in place of architecture 700. In architecture 900, speaker embeddings 606 are introduced prior to first complex encoder block 10001a, concatenated with the output of block 702.

Figure 10A:
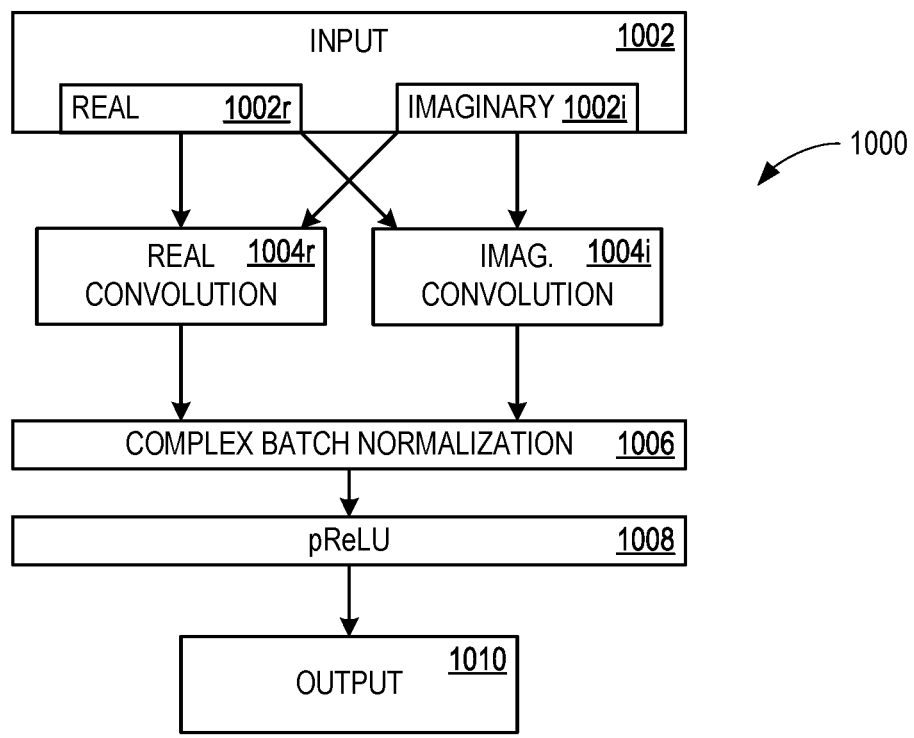
FIG. 10A illustrates an example complex encoder/decoder that may be used in various architectures described herein.

FIG. 10A illustrates an example complex encoder/decoder block 1000 that may be used in various architectures described herein, for example as encoder blocks 10001a and 10001f and decoder blocks 10002a and 10002f. An input 1002 is divided into a real component 1002r and an imaginary component 1002i. A real convolution 1004r and an imaginary convolution 1004i are performed and subject to complex BN 1006. This is followed by a pReLU 1008, to produce an output 1010.

Figure 10B:
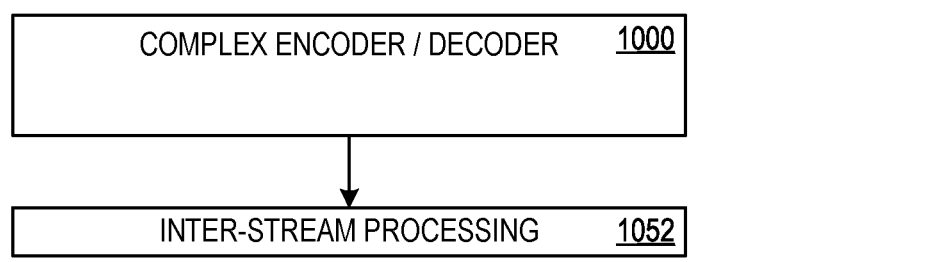
FIG. 10B illustrates the complex encoder/decoder of FIG. 10A with inter-stream processing.

FIG. 10B illustrates the complex encoder/decoder block 1000 of FIG. 10A with inter-stream processing 1052 in an arrangement 1050. In some examples, a virtual microphone is created by taking the average of all selected microphones (e.g., virtual microphone signal $Y_v$ of Eq. (6)). A fifth dimension is introduced that includes specific stream (microphone) information. In some examples, intra-stream processing processes each stream independently by combining stream and batch dimensions, whereas inter-stream processing performs averaging across streams on upper half of channels and concatenates the results to lower half channels of each stream. This is repeated for all layers in encoders and decoders, and the estimated mask is applied to the virtual microphone.

Examples of the disclosure produce improved results in comparison with prior PSE models. Clean speech data of the deep noise suppression (DNS) challenge (INTERSPEECH 2020/2021) was used for evaluating aspects of the disclosure. The data includes approximately 544 hours of speech samples from the LibriVox corpus that were obtained by selecting high mean opinion score (MOS) samples. Noise files and internal room impulse response (RIR) files were used to create noisy mixtures.

The noise and RIR files were split into training, validation, and test sets. 60% of the dataset contained samples including the target speaker, interfering speaker, and noise; the other 40% contained samples comprising the target speaker and noise. General SE samples (one speaker plus noise) were included so as not to degrade the performance in scenarios with no interfering speakers. The target speaker was assumed to be closer to the microphone than the interfering speaker. The target speaker was placed randomly between 0 to 1.3 meters away from the microphone and the interfering speaker was placed more than 2 meters away. 2000 and 50 hours of data for the training and validation, respectively, were simulated.

Test sets were created to capture single-channel PSE models' performance for three scenarios: 1) the target scenario (target+interfering speakers+noise), 2) the scenario in which no interfering speakers (target speaker+noise) are present, and 3) the scenario in which there are neither interfering speakers nor noise (target speaker only). For brevity, these scenarios are identified as "TS1", "TS2", and "TS3", respectively. TS2 is a benchmark test set with which to compare the PSE models with the unconditional SE models in a fair way. TS3 is helpful to determine the over-suppression rate of the target speaker. All the test sets contained reverberation.

Two clean speech sources were used for simulating the test sets: 1) internal conversational recordings (ICR) and 2) voice cloning toolkit (VCTK) corpus. The ICR data contained meeting audio recordings of 13 speakers obtained with headset microphones. The average duration of the recordings is 9 seconds, and the total duration is 3.3 hours. Ten (10) hours of data were simulated for each test case using the noise and RIRs mentioned above. For each speaker, approximately 60 seconds of enrollment audio was used to extract the d-vectors. However, aspects of the disclosure are operable with different lengths of enrollment audio, such as 30 seconds, 90 seconds, etc.

The VCTK corpus includes 109 speakers with different English accents. For each speaker, 30 samples were set aside and used to extract the speaker's d-vector. The noisy mixtures were simulated using the test noise and RIRs with the rest of the files. These noisy mixtures were concatenated to generate a single long audio file for each speaker. The average duration of the files was 27.5 minutes. This test set served the purpose of evaluating the models with long duration audio to which the models were not exposed during training and under changing environmental conditions.

The transcription and speech quality improvements were measured for the PSE models, relying on the word error rate (WER), deletion error rate (DEL), short-time objective intelligibility (STOI) and DNSMOS. DNSMOS is a neural network-based mean opinion score (MOS) estimator that was shown to correlate well with the human scorers. DEL was employed in addition to WER to measure the over-suppression (OS) of the target speaker. While DEL alone cannot measure OS ultimately, the new metric below is used to measure the target speaker OS reliably. The metric is defined as follows:

$$TSOS(t) = \begin{cases} 1, & \text{if } \sum_f \mathcal{L}_f(t,f) > \gamma \sum_f |S(t,f)|^P \\ 0, & \text{otherwise} \end{cases} \quad \text{Eq. (8)}$$

where $\tau$ is a threshold value and $L_{OS}$ is defined in Eq. (3). The over-suppression rate is calculated by subtracting the power-law compressed predicted magnitude from the reference one. The negative values are set to zero. If the values are positive, the reference signal has more energy for the given T-F bin. Therefore, the target speaker's voice is removed. The frequency bins of each time frame for the reference and OS spectrograms are summed and the reference is multiplied by a threshold value. Values for each time frame for both spectrograms are thus obtained. A logical comparison is applied to obtain binary values for each frame: if the OS is greater than the reference value, that frame is marked as over-suppressed. Now with TSOS measure, the percentage of the OS per sample, total OS duration, and maximum OS duration may be calculated.

Example models were compared with VoiceFilter. The VoiceFilter model was converted to a causal one by making the paddings for convolution layers causal and the LSTM layers unidirectional. For DCCRN and pDCCRN, the numbers of filters are [16; 32; 64; 128; 128; 128] for the encoder and decoder (inverse of the encoder) layers, and the kernel size was set to 5_2 and stride to 2_1 for each layer. The LSTM layer's hidden size was set to 128. For pDCATTU-NET, the numbers of filters were [32; 64; 128; 128; 128; 128] for the encoder and [128; 128; 128; 64; 32; 16] for the decoder. The hidden size of the bottleneck layer was set to 128. Adam optimizer was used with $\beta_1$=0:5, and the learning rate increased from zero to 1e-3 in the first 5K iterations, keeping constant until 100K iterations, and had cosine annealing applied until 300K iterations. The best model was selected according to the validation loss. The parameter $\alpha$ (see Eq. (2)) was set to 0.5 and 0.9, respectively, $\beta$ (see Eq. (3)) was set to 1.0, and y (see Eq. (8)) was set to 0.1.

Overall, pDCATTUNET yields superior results for both datasets compared to pDCCRN and the baseline models. While pDCCRN yields similar results to DCCRN in the TS2 scenario, pDCATTUNET can improve the results even with no interfering speech. However, the personalized models generally have higher TSOS % for scenarios when trained with the same loss function. Using the asymmetric loss function significantly improves the TSOS % and speech intelligibility. Furthermore, MT training with $L_{PLCPA}$ loss provides notable improvement to TSOS % compared with the asymmetric loss. However, MT training slightly reduces the speech quality. Additionally, MT training and asymmetric loss combination typically provides superior TSOS % for both pDCCRN and pDCATTUNET. For long-duration audio, MT training may degrade the overlapped speech WER for the pDCATTUNET, although the DEL is reduced. The insertion error is increased, indicating that the suppression of the interfering speech is degraded. This may be related to the usage of a single speaker for the ASR data during MT training. Adding interfering speech to ASR data can alleviate this issue.

An example multi-channel PSE was evaluated using simulated room impulse responses (RIRs). RIRs were generated for a 7-channel circular microphone array with radius r=4:25 cm, based on the image method with T60 in the range of 0.15 to 0.6 seconds. In this example, the array has seven microphones, although aspects of the disclosure may be used with a different quantity of microphones.

The microphone array was located in the center of the room. Target and interfering speakers were positioned randomly around the microphone array within [0.5, 2.5] meters with the assumption that the target speaker was the closest to the microphone array. For the training and validation dataset, 2000 and 50 hours of audio, respectively, were simulated based on the clean speech data from the DNS challenge dataset. In both datasets, 60% of utterances contained the target and interfering speakers with a signal-to-distortion ratio (SDR) between 0 to 10 dB. The simulated audio was mixed with directional and isotropic noises from the Audioset and Freesound datasets with a signal-to-noise ratio (SNR) in the range of [0, 15] dB. The sampling rate for all utterances was 16 kHz. The geometry agnostic model was trained with the 7-channel circular array and with three additional geometries derived from it: 4-channel triangular, 4-channel rectangular, and 6-channel circular arrays.

Two 10-hour test data were created: dataset A and B. Dataset A contained utterances mixed only with noise and reverberation. In contrast, dataset B contained utterances mixed with both noise, reverberation, and interfering speech. Clean utterances were selected from internal conversational style speech recordings with a high neural network-based mean opinion score (MOS). The SDR and SNR ranges were the same as the training dataset. The test utterances were convolved with RIRs from 8 different geometries. Four geometries were the same as the ones that were used for the training dataset. The other four geometries were unseen during the training and included a 3-channel triangular array with r=4:25 cm, a 5-channel circular array with r=3 cm, a 3-channel linear array with 6 cm length, and an 8-channel circular array with r=10 cm.

The enhanced speech signal was evaluated based on speech recognition accuracy and speech intelligibility. Two baselines were used for comparison with the geometry agnostic model. For each array geometry that was used in training, a fixed geometry model was trained based on IPD features. The other baseline was based on processing each microphone independently with a single-channel PSE model followed by averaging the enhanced signals. Although this approach was computationally expensive, it may be considered to be an acceptable alternative for unknown array geometries. Aspects of the disclosure are also operable with MVDR beamforming followed by a single-channel PSE. However, since the assumption is that there is no knowledge about the microphone array geometries, it may be challenging to accomplish beamforming in real-time.

The WER, SDR, and short-time objective intelligibility (STOI) results were reported. MCPSE using IPD for spatial features generally achieved the lowest WER and highest SDR and STOI scores. Multi-channel PSE models substantially outperformed the single-channel PSE model. Single-channel PSE introduces processing artifacts that yield worse WER scores compared to the unprocessed noisy mixture for dataset A. By contrast, the multi-channel PSE models improve the speech recognition performance.

With regard to the comparison between the two spatial features for the multi-channel PSE, the model trained with the IPD features performed consistently better than a model based on stacked STFTs. To test the value of spatial information, a multi-channel PSE was trained based on the IPD features without using d-vectors. The results demonstrated that spatial information was helpful regardless of the presence of d-vectors, in some examples.

To further investigate the effect of the spatial features, two versions of test dataset B were created. In the first version, speakers were randomly positioned such that the difference of their angle with respect to the array was less than 5 degrees, and their distance difference was more than 1 meter. In the second version, the angle difference of the speakers was more than 45 degrees, while the distance difference was less than 10 cm. The multi-channel PSE models performed the worst for the dataset with similar speaker angles. This result indicates that the model learned to discriminate essentially based on the angle rather than the distance. Also, when the two speakers were at similar distances, using d-vectors substantially improved the performance of the multi-channel PSE.

The geometry agnostic model outperformed fixed geometry models trained with their dedicated array geometries in both test datasets. This result validates that this approach could effectively decouple the array geometry and the model architecture. Without requiring changes in the model architecture for an individual array, a single model can be shared between multiple arrays with different shapes and different numbers of microphones.

The geometry agnostic model still outperformed the fixed geometry model for a 3-channel triangular array, which has fewer microphones than the arrays included in the training. For a 5-channel circular array, which has a different microphone arrangement, PSE with the geometry agnostic model was significant, and its performance was comparable to the results when the array geometries had been seen in training. Regarding the 3-channel linear array, the geometry agnostic model showed consistent improvements over the average of enhanced single-channel signals despite not seeing the front-back ambiguity of the linear arrays during the training.

For an 8-channel circular array with r=10 cm, the geometry agnostic model improved the performance compared with the average of the enhanced signals to a smaller extent, and the results for dataset A were worse in terms of WER and STOI. Spatial aliasing might be part of the reason for the poor performance of the 8-channel circular array. A large inter-microphone distance leads to spatial aliasing, and this can introduce unseen patterns for the IPD features. For example, spatial aliasing occurs in array geometries for which inter-microphone distance is longer than 4.28 cm with 16 kHz sampling rate. If the model was trained without IPD normalization, the performance degraded significantly, suggesting the spatial aliasing problem may be mitigated by IPD normalization.

Examples of the disclosure utilize spatial features along with speaker embeddings for PSE. Based on test results, this combination significantly improves the performance for both communication and transcription quality, consistently outperforming geometry dependent models. Some examples further include stream pooling layers for multi-channel PSE that is invariant to the number of microphones and their arrangement.

Figure 11:
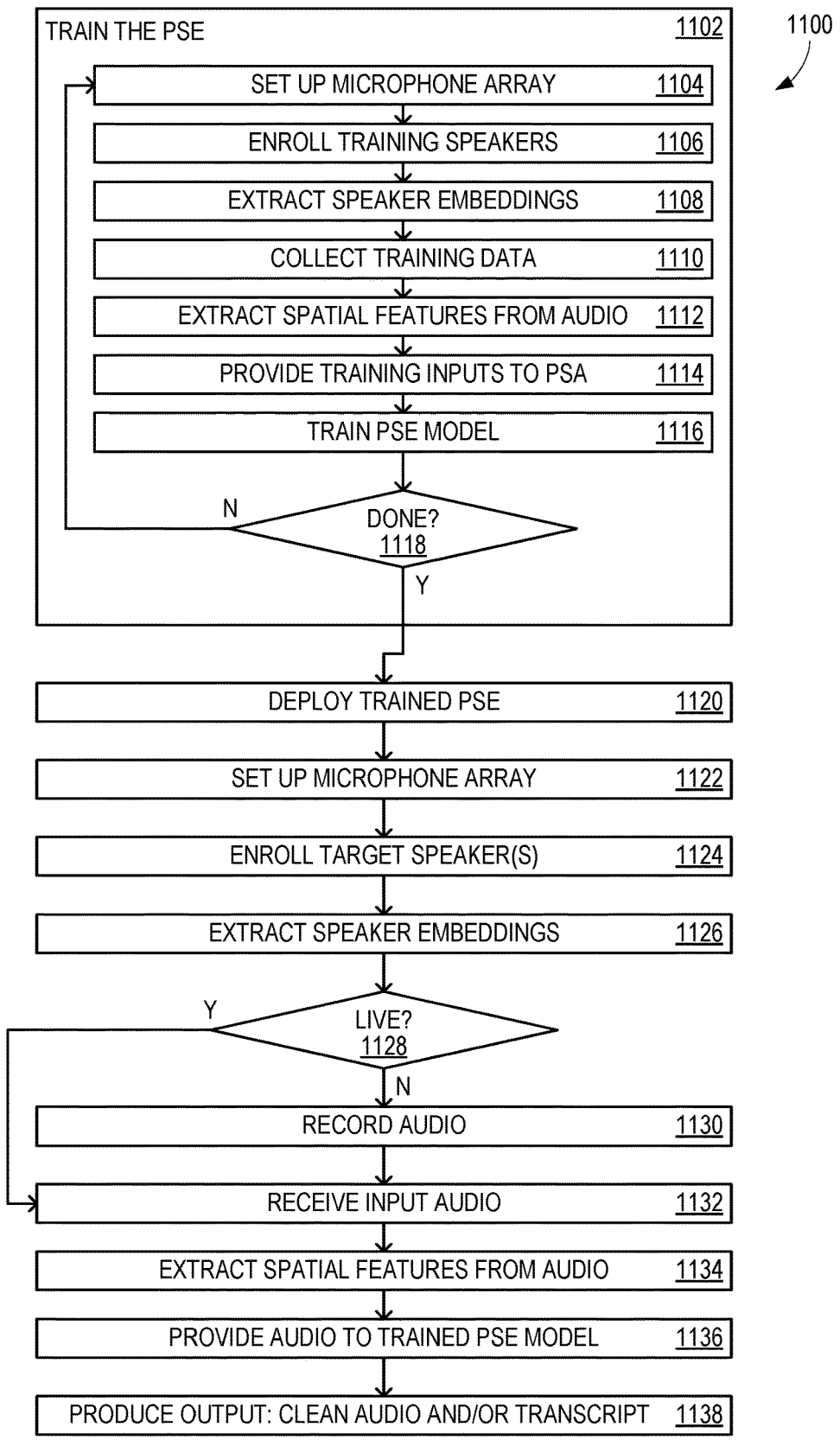
FIG. 11 is a flowchart illustrating exemplary operations that may be performed using the arrangement of FIG. 1.

FIG. 11 is a flowchart 1100 illustrating exemplary operations that may performed using arrangement 100. In some examples, operations described for flowchart 1100 are performed by computing apparatus 1418 of FIG. 14. Flowchart 1100 commences with operation 1102, which trains PSE model 110a to become trained PSE model 110, using operations 1104-1118. A training microphone array is set up with a training geometry in operation 1104. See FIG. 2 for various microphone geometries. Training will iterate through multiple microphone geometries, in order to remove geometry-specific learning from PSE model 110a. Target speakers used for training (e.g., training target speakers) are enrolled in operation 1106. One benefit of the current disclosure is that trained PSE model 110 may be used with different target speakers 102 and 102a that the training target speakers.

Operation 1108 extracts speaker embeddings from enrollment data for the training speakers, and operation 1110 collects training audio and truth information (training data 142). Operation 1112 extracts spatial features from training input audio captured by microphone array 200, the training input audio including a mixture of speech data of a training target speaker and a training interfering speaker. In some examples, the spatial features comprise an IPD. Operation 1114 provides the training input audio, the extracted spatial features, and the extracted speaker embeddings to PSE model 110a (the PSE model being trained).

Operation 1116 includes training PSE model 110a (which becomes trained PSE model 110) with training data 142. In some examples, training PSE model 110a comprises extracting spatial features from microphone array 200, and training PSE model 110a with the extracted spatial features. Decision operation 1118 determines whether training is completed with enough different microphone geometries. If not, flowchart 1100 returns to operation 1104 to continue training PSE model 110a using a plurality of microphone array geometries to produce trained PSE model 110. In some examples, the training of PSE model 110a comprises MT training. In some examples, the MT training comprises echo cancellation. In some examples, training PSE model 110a does not include training PSE model 110a with speech data of target speaker 102, target speaker 102a, or interfering speakers that will be encountered later (e.g., interfering speaker 104). In some examples, the plurality of microphone array geometries used during training does not include a microphone array geometry used to capture input audio 112.

When training is complete, operation 1120 deploys trained PSE model 110. In some examples, trained PSE model 110 comprises a trained geometry-agnostic PSE model. Microphone array 200 is set up in operation 1122. In some examples, this occurs when a notebook computer, that will be used by target speaker 102 is built.

Target speaker 102 is enrolled in operation 1124, which may also include enrolling target speaker 102a and any other target speakers. Trained PSE model 110 does not require re-training for target speaker 102 or 102a, only enrollment with a short voice sample of a few minutes in order to capture voice characteristics. Trained PSE model 110 will suppress any speaker that is not enrolled. Operation 1126 includes extracting speaker embeddings (e.g., speaker embeddings 308, 606) from enrollment data 326 for at least target speaker 102. In some examples, enrollment data 326 is single-channel enrollment data. In some examples, the speaker embeddings are extracted from enrollment data 326 for target speaker 102 and a second target speaker. In such examples, output data 114 further comprises estimated clean speech data of target speaker 102a. In some examples, the extracted speaker embeddings represent acoustic characteristics of target speaker 102. In some examples, the extracted speaker embeddings represent acoustic characteristics of both target speaker 102 and target speaker 102a. In some examples, the extracted speaker embeddings are expressed as d-vectors;

Decision 1128 determines whether PSE will be performed in real-time (on live audio), or on recorded audio. If on recorded audio, operation 1130 records the captured audio in a multi-channel format to preserve individual microphone audio streams. Operation 1132 includes receiving input audio 112. In some examples, input audio 112 comprises recorded audio, and operation 1132 includes playing the recorded audio. In some examples, the input audio comprises real-time audio. In such examples, producing output data 114 comprises producing output data 114 in real-time.

Operation 1134 includes extracting spatial features 660 from input audio 112 captured by microphone array 200, input audio 112 including a mixture of speech data of target speaker 102 and interfering speaker 104. In some examples, the spatial features comprise an IPD. Operation 1136 includes providing input audio 112, the extracted spatial features, and the extracted speaker embeddings to a trained geometry-agnostic personalized speech enhancement (PSE) model. Operation 1138 includes using trained PSE model 110, producing output data 114, output data 114 comprising estimated clean speech data of target speaker 102 with a reduction of speech data of interfering speaker 104. In some examples, operation 1138 includes producing output data 114 using a geometry-agnostic version of trained PSE model 110 without geometry information for microphone array 200.

In some examples, output data 114 comprises estimated clean speech data of target speaker 102 without speech data from interfering speaker 104. In some examples, output data 114 comprises audio of the estimated clean speech data of target speaker 102. In some examples, output data 114 further comprises estimated clean speech data of target speaker 102a. In some examples, output data 114 comprises audio of the estimated clean speech data of target speaker 102a. In some examples, producing output data 114 using trained PSE model 110 comprises performing an inference with trained PSE model 110. In some examples, performing an inference with trained PSE model 110 comprises using stream pooling layers that are based on at least averaging and concatenation of feature maps. In some examples, output data 114 is sent to transcription service 130 to produce transcript 132 of the estimated clean speech data of target speaker 102 and or target speaker 102a. In such examples, operation 1138 includes generating, from output data 114, a transcript of the estimated clean speech data of first target speaker 102 and/or second target speaker 102a.

In some examples, producing output data 114 using trained PSE model 110 comprises isolating speech data of target speaker 102 in a manner that is agnostic of a configuration of microphone array 200. In some examples, producing output data 114 comprises, based on at least the provided input data, receiving a mask from trained PSE model 110, and applying the mask to input audio 112. In some examples, producing output data 114 using trained PSE model 110 comprises isolating speech data of target speaker 102 from at least interfering speaker 104. In some examples, producing output data 114 using trained PSE model 110 comprises isolating speech data of target speaker 102 from at least interfering speaker 104 and background noise 112d. In some examples, producing output data 114 using trained PSE model 110 comprises isolating speech data of target speaker 102 in the input audio data using a profile of a voice of target speaker 102.

Figure 12:
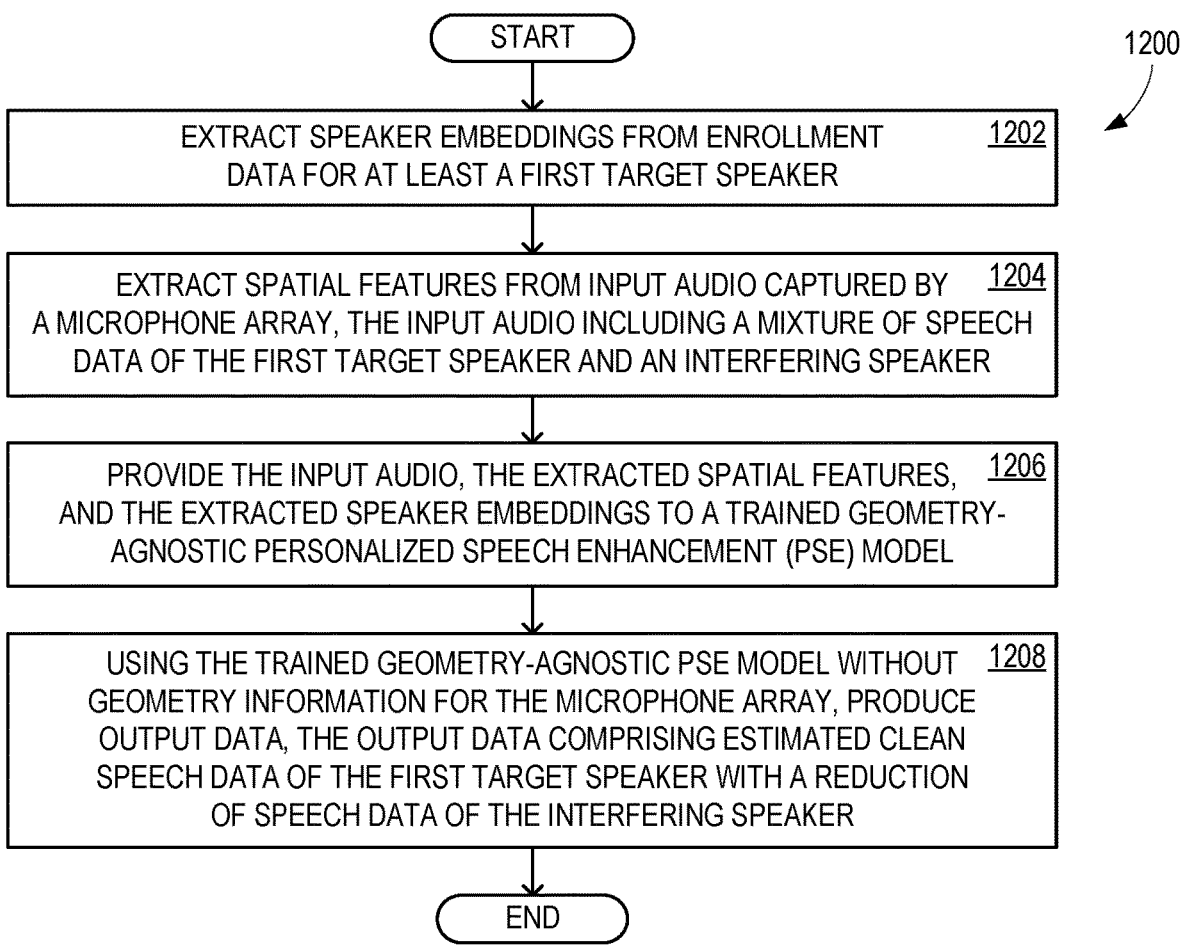
FIG. 12 is another flowchart illustrating exemplary operations that may be performed using the arrangement of FIG. 1.

FIG. 12 is a flowchart 1200 illustrating exemplary operations associated with arrangement 100. In some examples, operations described for flowchart 1200 are performed by computing apparatus 1418 of FIG. 14. Flowchart 1200 commences with operation 1202, which includes extracting speaker embeddings from enrollment data for at least a first target speaker. Operation 1204 includes extracting spatial features from input audio captured by a microphone array, the input audio including a mixture of speech data of the first target speaker and an interfering speaker. Operation 1206 includes providing the input audio, the extracted spatial features, and the extracted speaker embeddings to a trained geometry-agnostic PSE model. Operation 1208 includes using the trained geometry-agnostic PSE model without geometry information for the microphone array, producing output data, the output data comprising estimated clean speech data of the first target speaker with a reduction of speech data of the interfering speaker.

Figure 13:
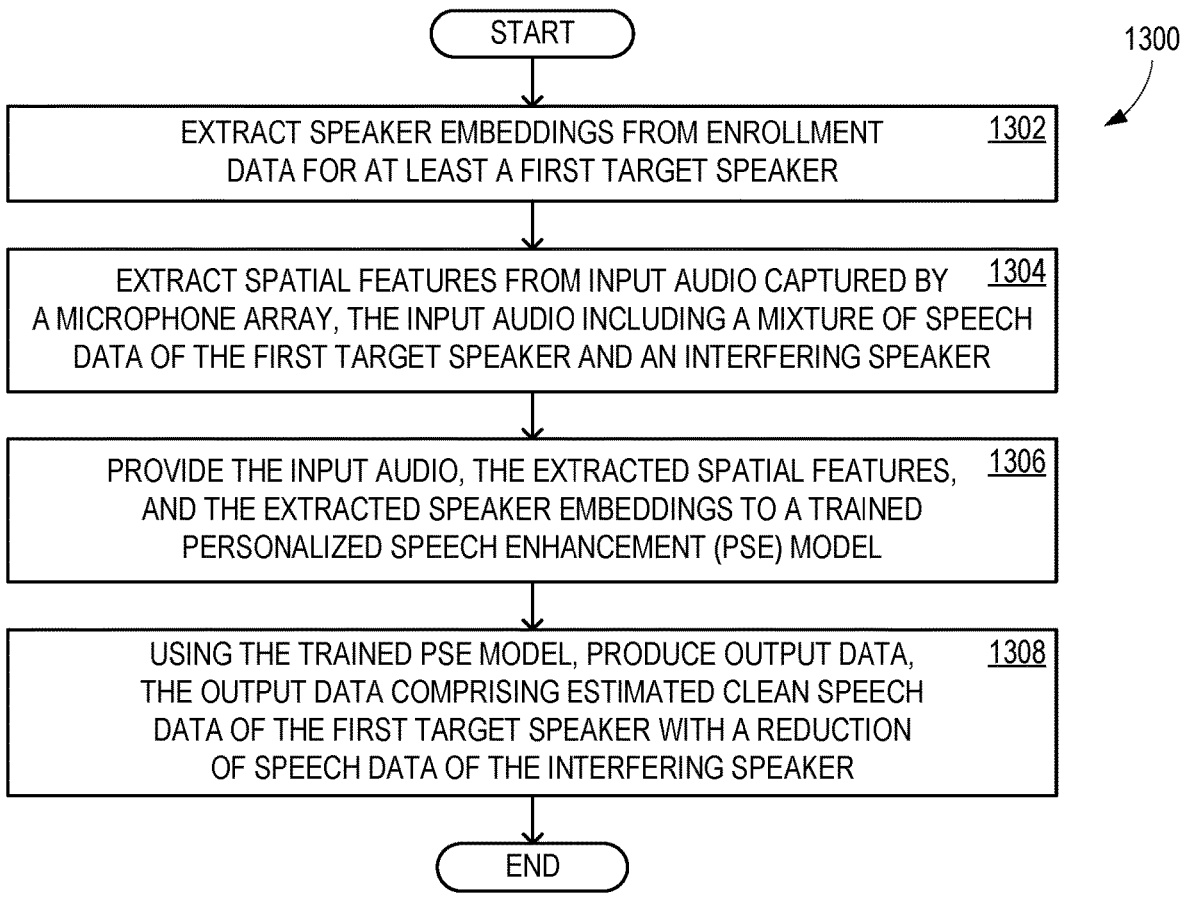
FIG. 13 is another flowchart illustrating exemplary operations that may be performed using the arrangement of FIG. 1.

FIG. 13 is a flowchart 1300 illustrating exemplary operations associated with arrangement 100. In some examples, operations described for flowchart 1300 are performed by computing apparatus 1418 of FIG. 14. Flowchart 1300 commences with operation 1302, which includes extracting speaker embeddings from enrollment data for at least a first target speaker. Operation 1304 includes extracting spatial features from input audio captured by a microphone array, the input audio including a mixture of speech data of the first target speaker and an interfering speaker. Operation 1306 includes providing the input audio, the extracted spatial features, and the extracted speaker embeddings to a trained PSE model. Operation 1308 includes using the trained PSE model, producing output data, the output data comprising estimated clean speech data of the first target speaker with a reduction of speech data of the interfering speaker.

Additional Examples

An example computerized method comprises: extracting speaker embeddings from enrollment data for at least a first target speaker; extracting spatial features from input audio captured by a microphone array, the input audio including a mixture of speech data of the first target speaker and an interfering speaker; providing the input audio, the extracted spatial features, and the extracted speaker embeddings to a trained geometry-agnostic PSE model; and using the trained geometry-agnostic PSE model without geometry information for the microphone array, producing output data, the output data comprising estimated clean speech data of the first target speaker with a reduction of speech data of the interfering speaker.

Another example method comprises: extracting speaker embeddings from enrollment data for at least a first target speaker; extracting spatial features from input audio captured by a microphone array, the input audio including a mixture of speech data of the first target speaker and an interfering speaker; providing the input audio, the extracted spatial features, and the extracted speaker embeddings to a trained PSE model; and using the trained PSE model, producing output data, the output data comprising estimated clean speech data of the first target speaker with a reduction of speech data of the interfering speaker.

An example system for array geometry agnostic multi-channel PSE comprises: a processor; and a computer-readable medium storing instructions that are operative upon execution by the processor to: extract speaker embeddings from enrollment data for at least a first target speaker; extract spatial features from input audio captured by a microphone array, the input audio including a mixture of speech data of the first target speaker and an interfering speaker; provide the input audio, the extracted spatial features, and the extracted speaker embeddings to a trained geometry-agnostic PSE model; and using the trained geometry-agnostic PSE model without geometry information for the microphone array, produce output data, the output data comprising estimated clean speech data of the first target speaker with a reduction of speech data of the interfering speaker.

Another example system comprises: a processor; and a computer-readable medium storing instructions that are operative upon execution by the processor to: extract speaker embeddings from enrollment data for at least a first target speaker; extract spatial features from input audio captured by a microphone array, the input audio including a mixture of speech data of the first target speaker and an interfering speaker; provide the input audio, the extracted spatial features, and the extracted speaker embeddings to a trained PSE model; and using the trained PSE model, produce output data, the output data comprising estimated clean speech data of the first target speaker with a reduction of speech data of the interfering speaker.

One or more example computer storage devices have computer-executable instructions stored thereon, which, on execution by a computer, cause the computer to perform operations comprising: extracting speaker embeddings from enrollment data for at least a first target speaker; extracting spatial features from input audio captured by a microphone array, the input audio including a mixture of speech data of the first target speaker and an interfering speaker; providing the input audio, the extracted spatial features, and the extracted speaker embeddings to a trained geometry-agnostic PSE model; and using the trained geometry-agnostic PSE model without geometry information for the microphone array, producing output data, the output data comprising estimated clean speech data of the first target speaker with a reduction of speech data of the interfering speaker.

One or more example computer storage devices have computer-executable instructions stored thereon, which, on execution by a computer, cause the computer to perform operations comprising: extracting speaker embeddings from enrollment data for at least a first target speaker; extracting spatial features from input audio captured by a microphone array, the input audio including a mixture of speech data of the first target speaker and an interfering speaker; providing the input audio, the extracted spatial features, and the extracted speaker embeddings to a trained PSE model; and using the trained PSE model, producing output data, the output data comprising estimated clean speech data of the first target speaker with a reduction of speech data of the interfering speaker.

Alternatively, or in addition to the other examples described herein, examples include any combination of the following:

training a PSE model using a plurality of microphone array geometries to produce the trained geometry-agnostic PSE model;

the plurality of microphone array geometries used during training does not include a microphone array geometry used to capture the input audio, and wherein training the PSE model does not include training the PSE model with speech data of the first target speaker, or the second target speaker, or the interfering speaker;

the output data comprises audio of the estimated clean speech data of the first target speaker of the estimated clean speech data of the first target speaker;

generating, from the output data, a transcript of the estimated clean speech data of the first target speaker;

the speaker embeddings are extracted from enrollment data for the first target speaker and a second target speaker, and wherein the output data further comprises estimated clean speech data of the second target speaker;

the input audio comprises real-time audio, and wherein producing the output data comprises producing the output data in real-time;

the spatial features comprise an IPD;

the extracted speaker embeddings represent acoustic characteristics of the first target speaker;

the extracted speaker embeddings represent acoustic characteristics of the first target speaker and the second target speaker;

the extracted speaker embeddings are expressed as d-vectors;

extracting the spatial features comprises stacking, in a channel dimension, real and imaginary parts of a short time Fourier transform for all microphones in the microphone array;

extracting the spatial features comprises implicitly learning spectral and spatial information from the microphone array;

extracting the spatial features comprises explicitly extracting spatial features from the microphone array;

the output data comprises audio of the estimated clean speech data of the second target speaker;

generating, from the output data, a transcript of the estimated clean speech data of the second target speaker;

the output data comprises estimated clean speech data of the first target speaker without speech data from the interfering speaker;

producing the output data using the trained geometry-agnostic PSE model comprises performing an inference with the trained geometry-agnostic PSE model;

performing an inference with the trained geometry-agnostic PSE model comprises using stream pooling layers that are based on at least averaging and concatenation of feature maps;

producing the output data using the trained geometry-agnostic PSE model comprises isolating speech data of the first target speaker in a manner that is agnostic of a configuration of the microphone array;

producing the output data comprises, based on at least the provided input data, receiving a mask from the trained geometry-agnostic PSE model, and applying the mask to the input audio;

producing the output data using the trained geometry-agnostic PSE model comprises isolating speech data of the first target speaker from at least the interfering speaker;

producing the output data using the trained geometry-agnostic PSE model comprises isolating speech data of the first target speaker from at least the interfering speaker and background noise;

producing the output data using the trained geometry-agnostic PSE model comprises isolating speech data of the first target speaker in the input audio data using a profile of a voice of the first target speaker;

receiving the input audio;

the input audio comprises recorded audio;

the training of the PSE model comprises MT training;

the MT training comprises echo cancellation;

training the PSE model does not include training the PSE model with speech data of the first target speaker;

training the PSE model does not include training the PSE model with speech data of the second target speaker;

training the PSE model does not include training the PSE model with speech data of the interfering speaker; and training the PSE model comprises extracting spatial features from the microphone array, and training the PSE model with the extracted spatial features.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
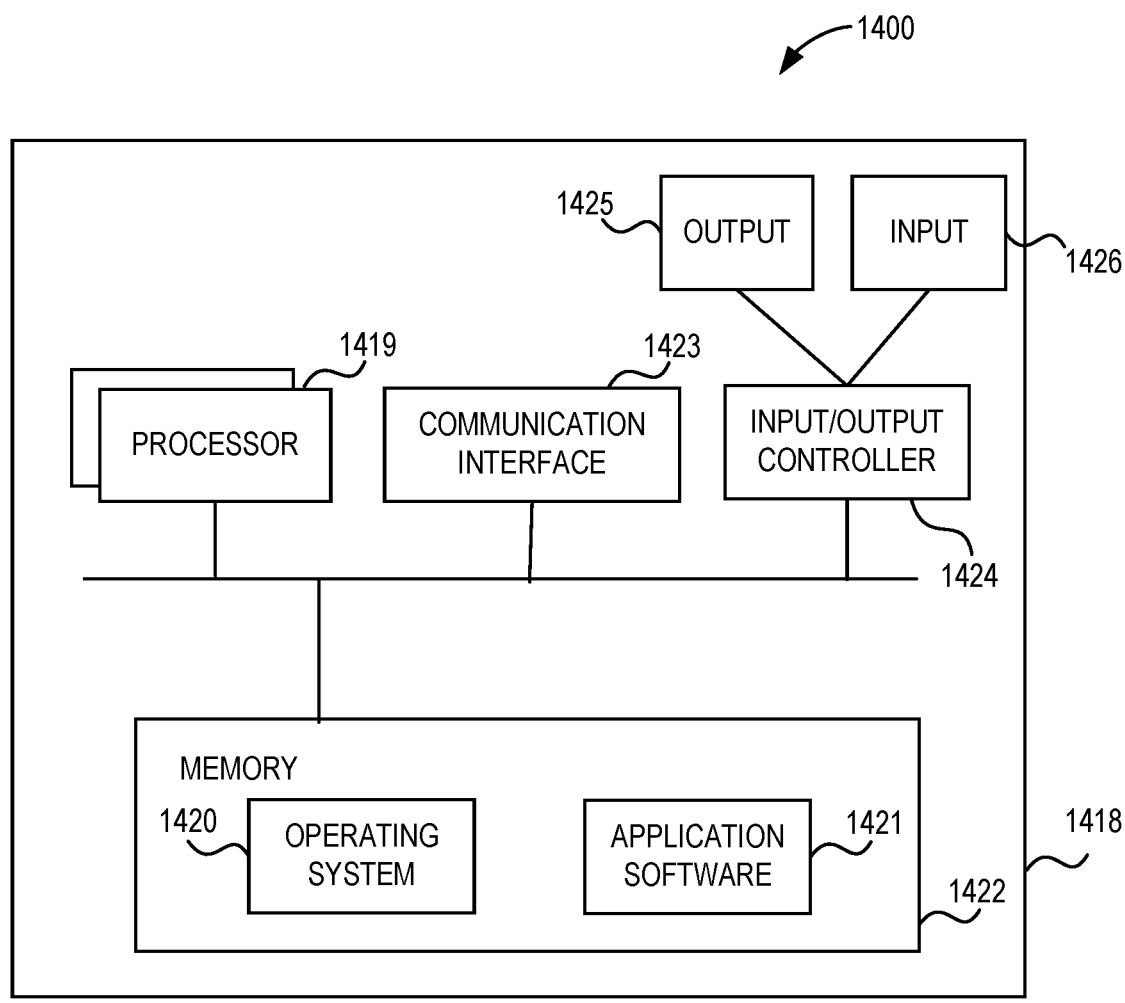
FIG. 14 is a block diagram of an example computing environment suitable for implementing some of the various examples disclosed herein.

The present disclosure is operable with a computing device according to an embodiment as a functional block diagram 1400 in FIG. 14. In an example, components of a computing apparatus 1418 are implemented as a part of an electronic device according to one or more embodiments described in this specification. The computing apparatus 1418 comprises one or more processors 1419 which may be microprocessors, controllers, or any other suitable type of processors for processing computer executable instructions to control the operation of the electronic device. Alternatively, or in addition, the processor 1419 is any technology capable of executing logic or instructions, such as a hard-coded machine. In some examples, platform software comprising an operating system 1420 or any other suitable platform software is provided on the apparatus 1418 to enable application software 1421 to be executed on the device.

In some examples, computer executable instructions are provided using any computer-readable media that are accessible by the computing apparatus 1418. Computer-readable media include, for example, computer storage media such as a memory 1422 and communications media. Computer storage media, such as a memory 1422, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1422) is shown within the computing apparatus 1418, it will be appreciated by a person skilled in the art, that, in some examples, the storage is distributed or located remotely and accessed via a network or other communication link (e.g., using a communication interface 1423).

Further, in some examples, the computing apparatus 1418 comprises an input/output controller 1424 configured to output information to one or more output devices 1425, for example a display or a speaker, which are separate from or integral to the electronic device. Additionally, or alternatively, the input/output controller 1424 is configured to receive and process an input from one or more input devices 1426, for example, a keyboard, a microphone, or a touchpad. In one example, the output device 1425 also acts as the input device. An example of such a device is a touch sensitive display. The input/output controller 1424 may also output data to devices other than the output device, e.g., a locally connected printing device. In some examples, a user provides input to the input device(s) 1426 and/or receive output from the output device(s) 1425.

The functionality described herein can be performed, at least in part, by one or more hardware logic components. According to an embodiment, the computing apparatus 1418 is configured by the program code when executed by the processor 1419 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein. Any range or device value given herein may be extended or altered without losing the effect sought, as will be apparent to the skilled person. While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a processor; and
    a computer-readable medium storing instructions that are operative upon execution by the processor to:
        extract speaker embeddings from enrollment data for a first target speaker;
        extract spatial features from input audio captured by a microphone array, the input audio including a mixture of speech data of the first target speaker and an interfering speaker;
        provide the input audio, the extracted speaker embeddings, and the extracted spatial features to a geometry-agnostic personalized speech enhancement (PSE) model trained with a virtual microphone signal comprising a combination of outputs of microphones in a multi-channel microphone array having different array geometries; and
        produce output data using the geometry-agnostic PSE model without geometry information for the microphone array, the output data comprising estimated clean speech data of the first target speaker with a reduction of speech data of the interfering speaker.

2. The system of claim 1, wherein the multi-channel microphone array having different array geometries used during training does not include a microphone array geometry used to capture the input audio, and wherein training the PSE model does not include training the PSE model with speech data of the first target speaker, or a second target speaker, or the interfering speaker.

3. The system of claim 1, wherein the output data comprises audio of the estimated clean speech data of the first target speaker, and wherein the instructions are further operative to:
    generate, from the output data, a transcript of the estimated clean speech data of the first target speaker.

4. The system of claim 1, wherein the speaker embeddings are extracted from enrollment data for the first target speaker and a second target speaker, and wherein the output data further comprises estimated clean speech data of the second target speaker.

5. The system of claim 1, wherein the input audio comprises real-time audio, and wherein producing the output data comprises producing the output data in real-time.

6. The system of claim 1, wherein the spatial features comprise an inter-channel phase difference (IPD).

7. A computerized method comprising:
    extracting speaker embeddings from enrollment data for a first target speaker;
    extracting spatial features from input audio captured by a microphone array, the input audio including a mixture of speech data of the first target speaker and an interfering speaker;
    providing the input audio, the extracted speaker embeddings, and the extracted spatial features to a geometry-agnostic personalized speech enhancement (PSE) model trained with a virtual microphone signal comprising a combination of outputs of microphones in a multi-channel microphone array having different array geometries; and producing output data using the geometry-agnostic PSE model without geometry information for the microphone array, the output data comprising estimated clean speech data of the first target speaker with a reduction of speech data of the interfering speaker.

8. The method of claim 7, wherein the multi-channel microphone array having different array geometries used during training does not include a microphone array geometry used to capture the input audio, and wherein training the PSE model does not include training the PSE model with speech data of the first target speaker, or a second target speaker, or the interfering speaker.

9. The method of claim 7, wherein the output data comprises audio of the estimated clean speech data of the first target speaker, and wherein the method further comprises:
generating, from the output data, a transcript of the estimated clean speech data of the first target speaker.

10. The method of claim 7, wherein the speaker embeddings are extracted from enrollment data for the first target speaker and a second target speaker, and wherein the output data further comprises estimated clean speech data of the second target speaker.

11. The method of claim 7, wherein the input audio comprises real-time audio, and wherein producing the output data comprises producing the output data in real-time.

12. The method of claim 7, wherein the spatial features comprise an inter-channel phase difference (IPD).

13. One or more computer storage devices having computer-executable instructions stored thereon, which, on execution by a computer, cause the computer to perform operations comprising:
extracting speaker embeddings from enrollment data for a first target speaker;
extracting spatial features from input audio captured by a microphone array, the input audio including a mixture of speech data of the first target speaker and an interfering speaker;
providing the input audio, the extracted speaker embeddings, and the extracted spatial features to a geometry-agnostic personalized speech enhancement (PSE) model trained with a virtual microphone signal comprising a combination of outputs of microphones in a multi-channel microphone array having different array geometries; and
using the geometry-agnostic PSE model without geometry information for the microphone array, producing output data, the output data comprising estimated clean speech data of the first target speaker with a reduction of speech data of the interfering speaker.

14. The one or more computer storage devices of claim 13, wherein the output data comprises audio of the estimated clean speech data of the first target speaker, and wherein the operations further comprise:
generating, from the output data, a transcript of the estimated clean speech data of the first target speaker.

15. The one or more computer storage devices of claim 13, wherein the speaker embeddings are extracted from enrollment data for the first target speaker and a second target speaker, and wherein the output data further comprises estimated clean speech data of the second target speaker.

16. The one or more computer storage devices of claim 13, wherein the input audio comprises real-time audio, and wherein producing the output data comprises producing the output data in real-time.

17. The one or more computer storage devices of claim 13, wherein the spatial features comprise an inter-channel phase difference (IPD).

18. The one or more computer storage devices of claim 13, wherein the multi-channel microphone array having different array geometries used during training does not include a microphone array geometry used to capture the input audio, and wherein training the PSE model does not include training the PSE model with speech data of the first target speaker, or a second target speaker, or the interfering speaker.

* * * * *